April 25, 1939.                J. DE LA CIERVA                2,155,409
                        AIRCRAFT WITH AUTOROTATIVE WINGS
                Filed Jan. 15, 1936        14 Sheets-Sheet 3
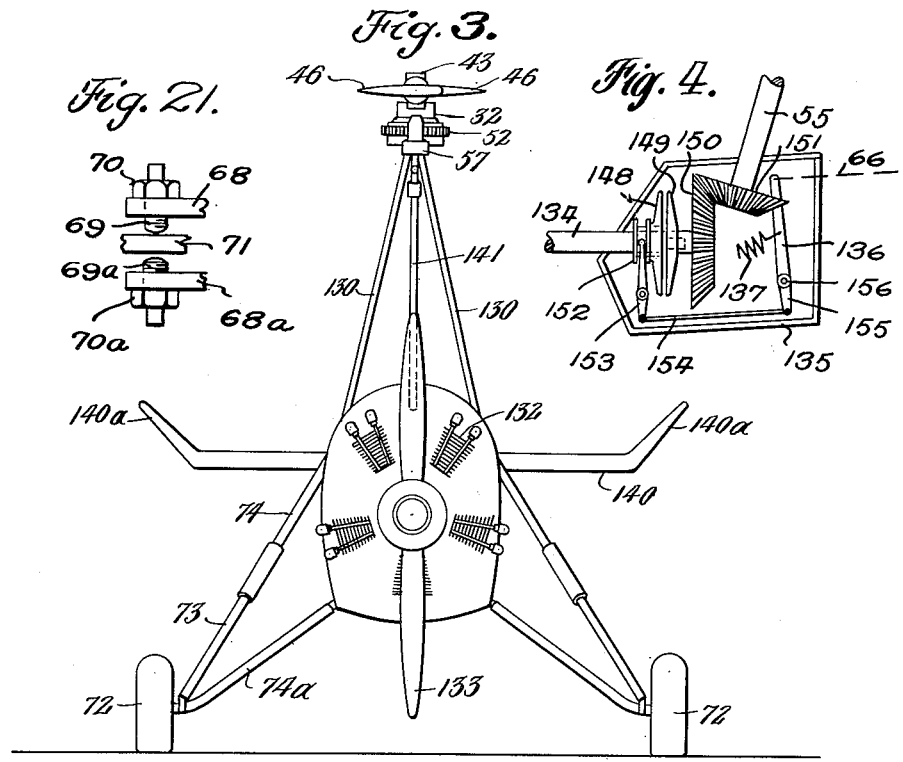
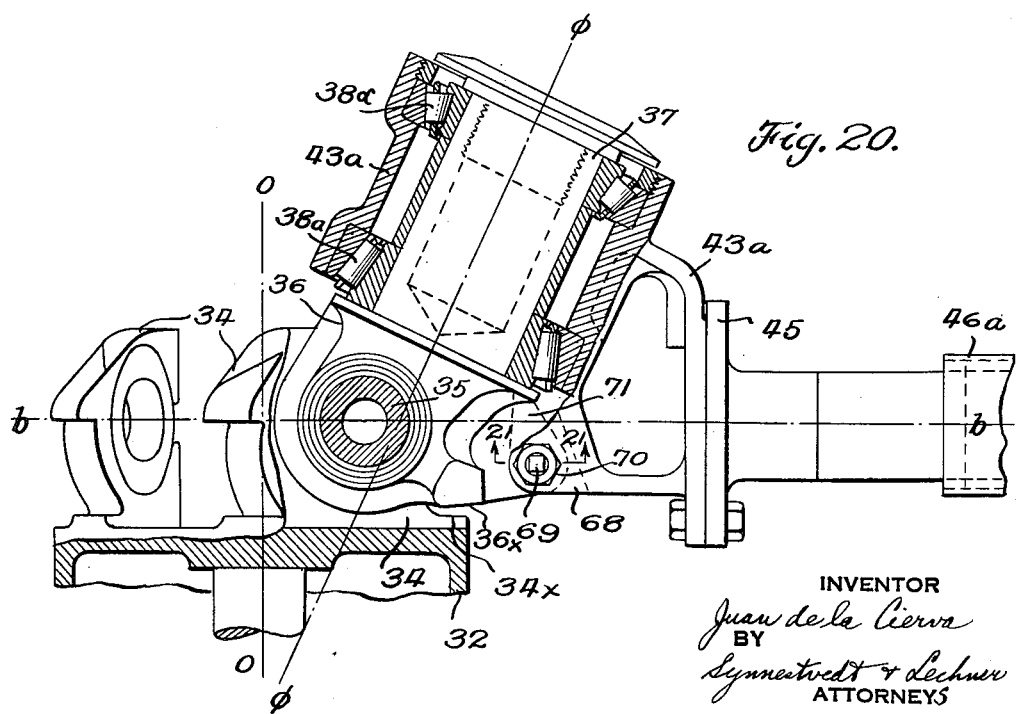
INVENTOR
Juan de la Cierva
BY
Synnestvedt & Lechner
ATTORNEYS

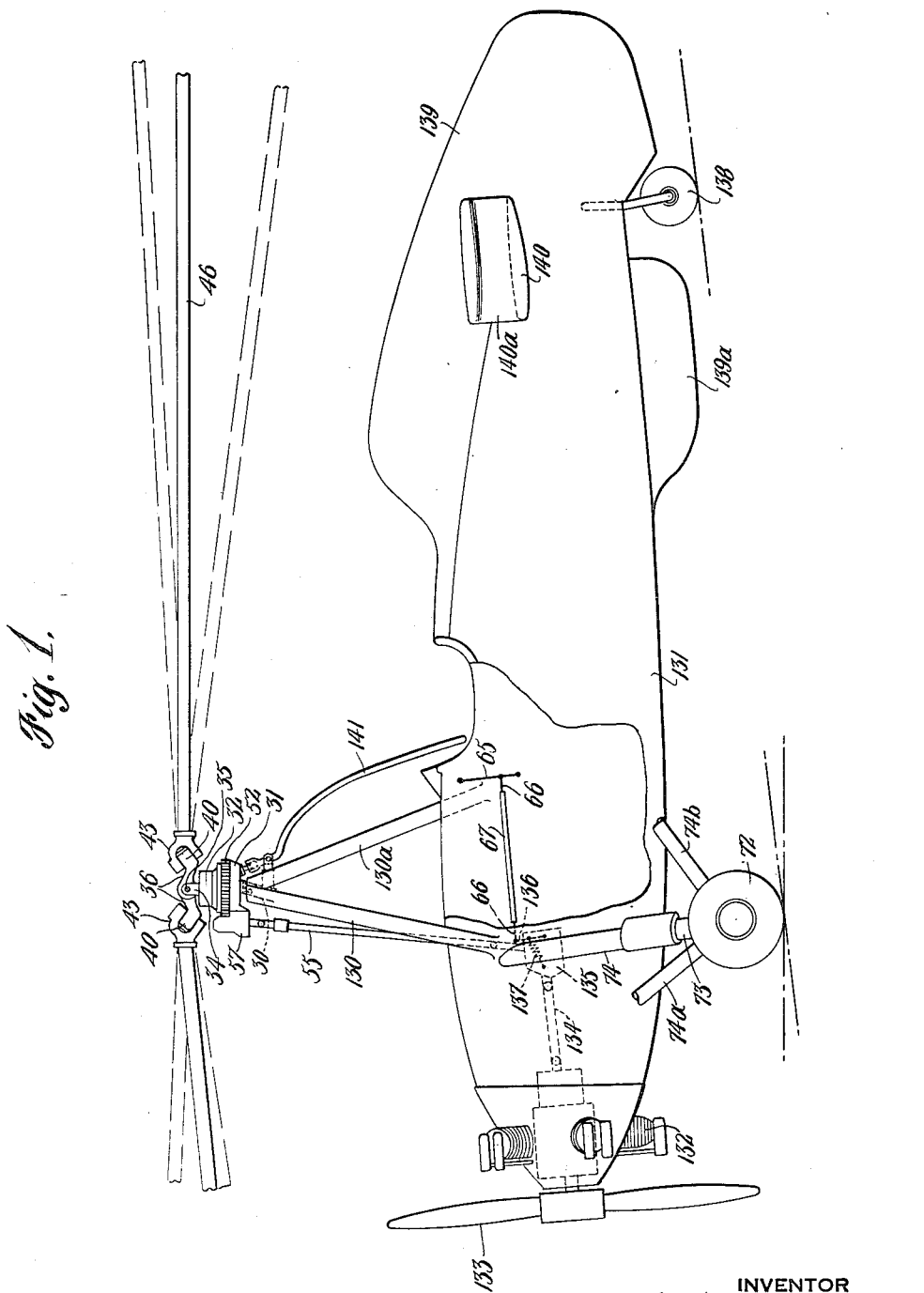

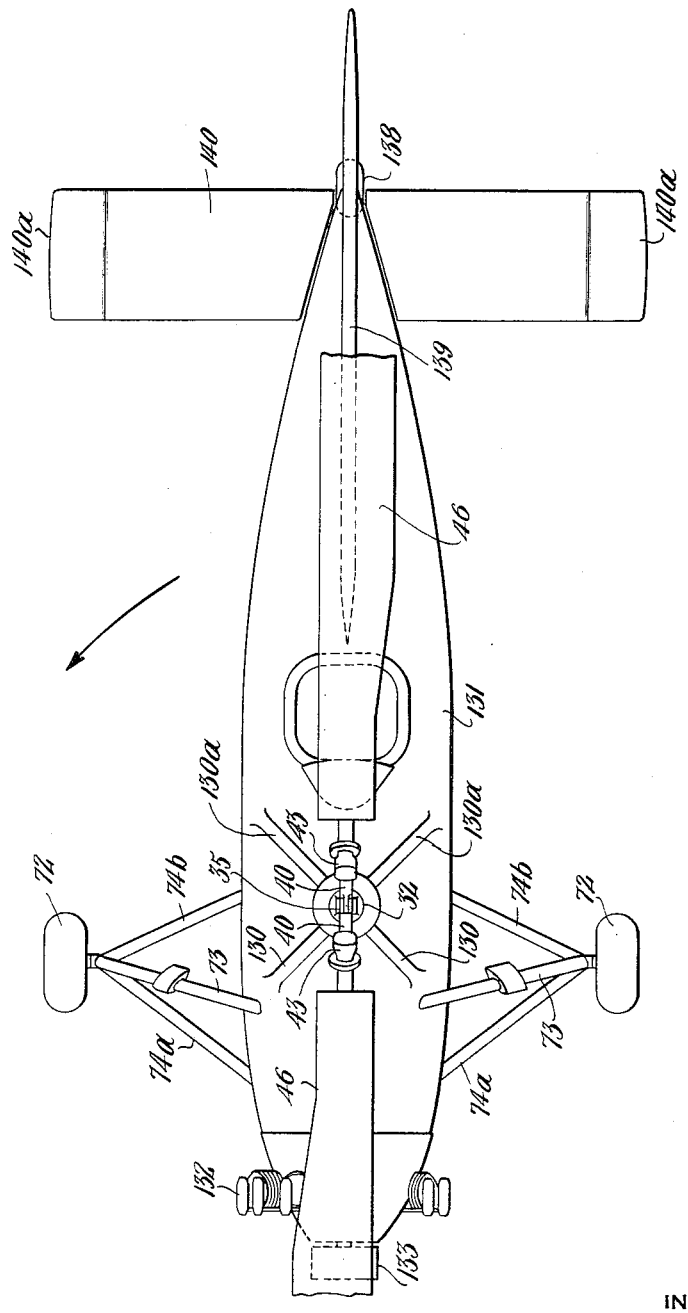

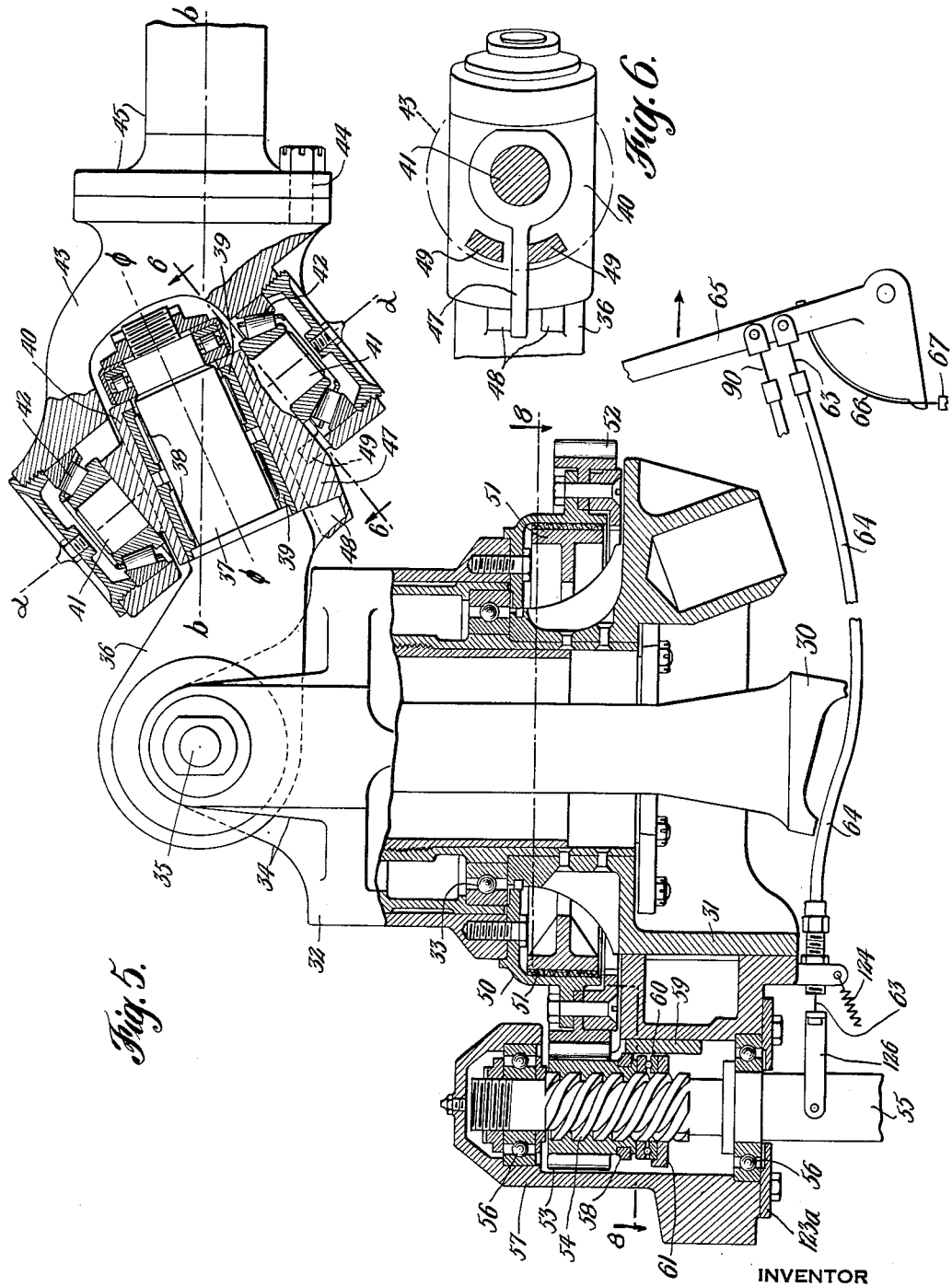

April 25, 1939.   J. DE LA CIERVA   2,155,409
AIRCRAFT WITH AUTOROTATIVE WINGS
Filed Jan. 15, 1936   14 Sheets-Sheet 5

INVENTOR
Juan de la Cierva
BY
Symmestvedt & Lechner
ATTORNEYS

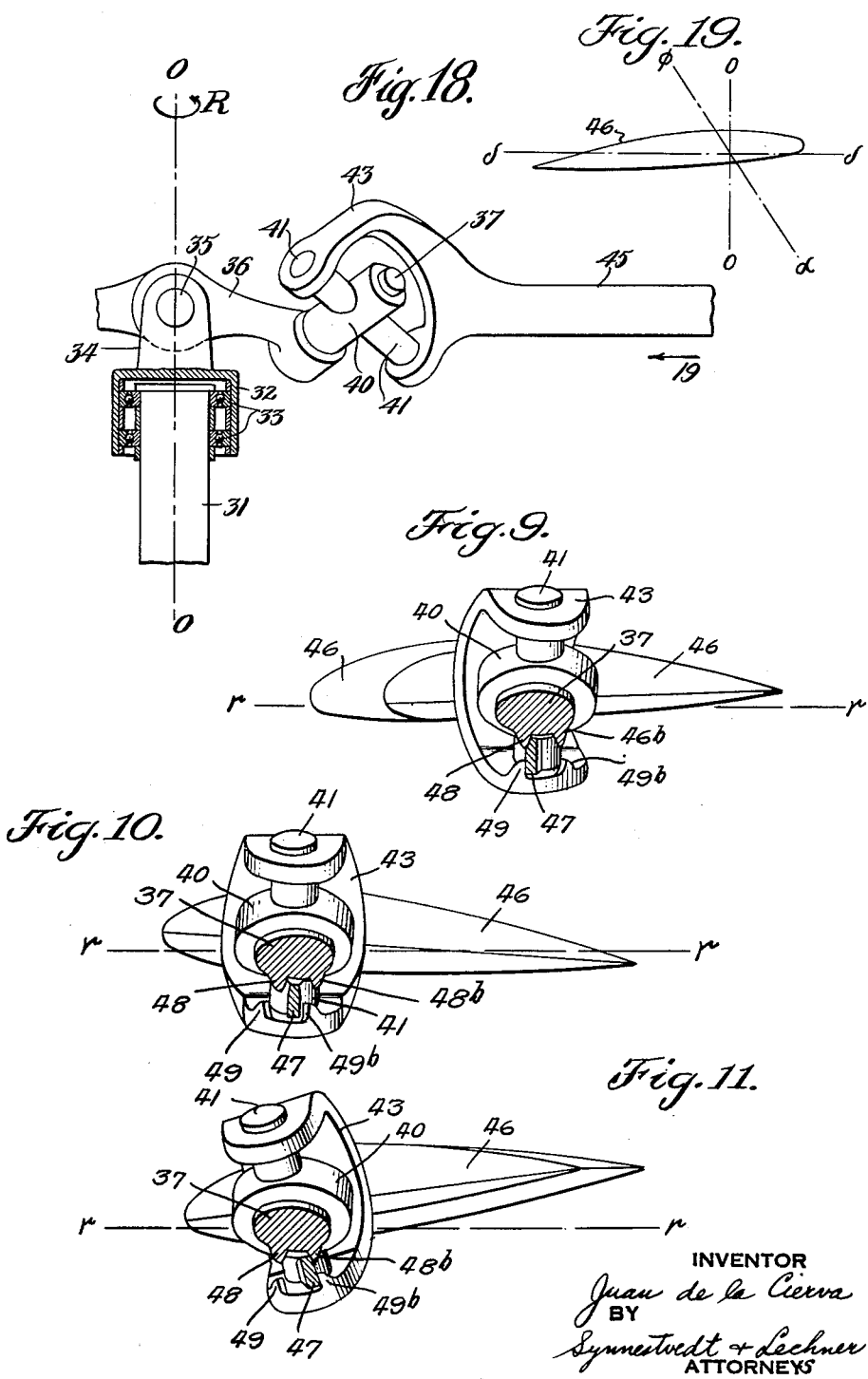

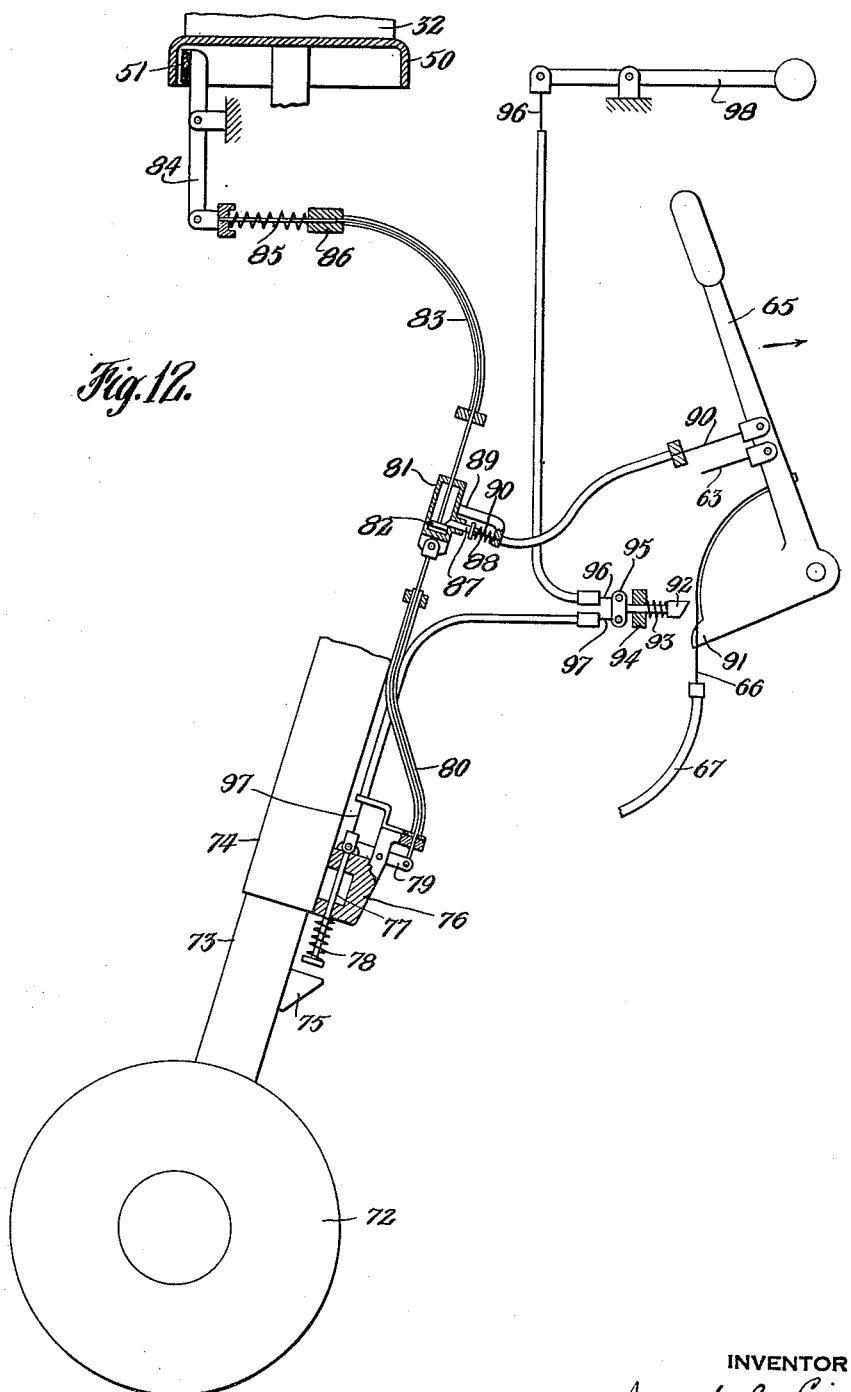

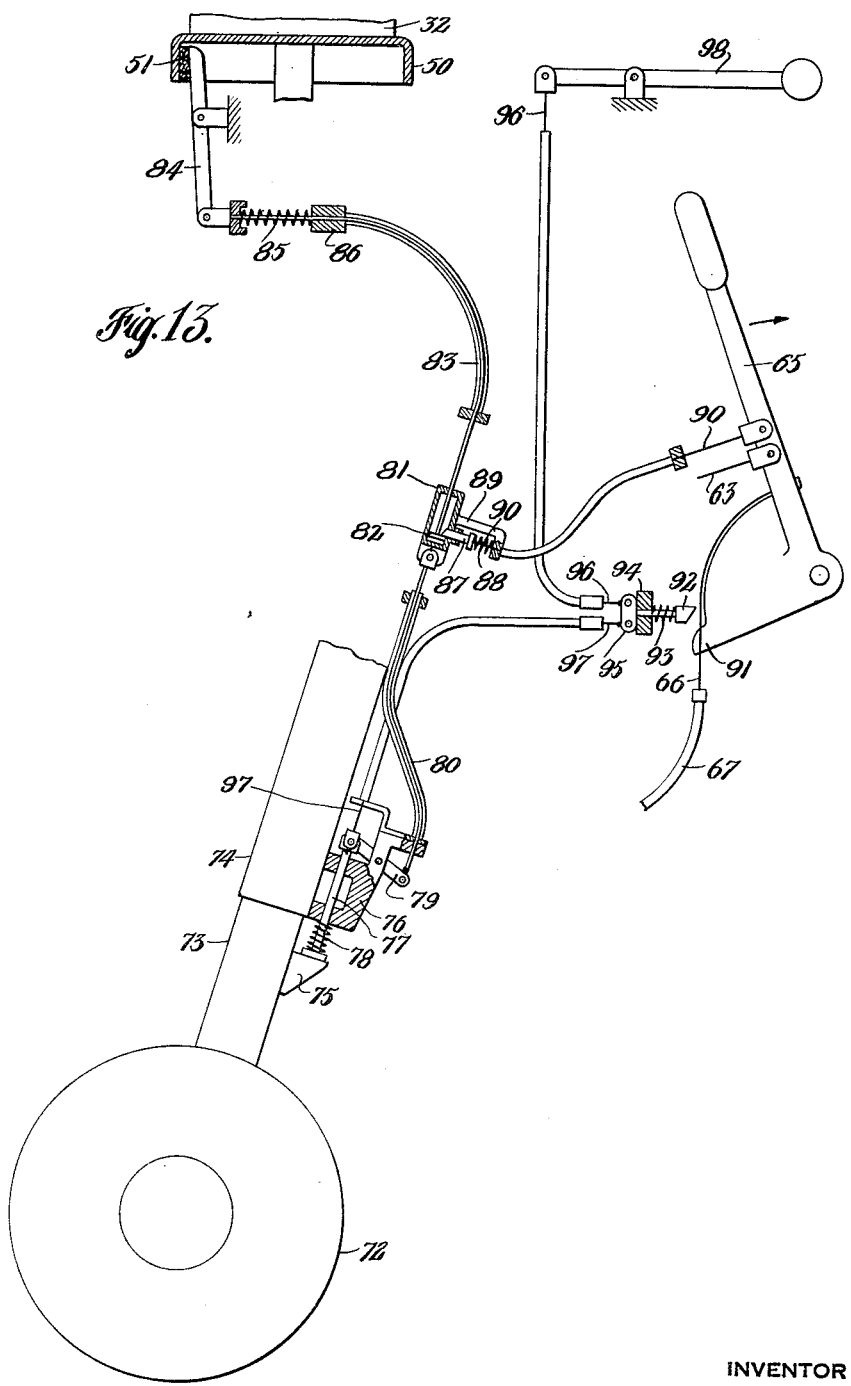

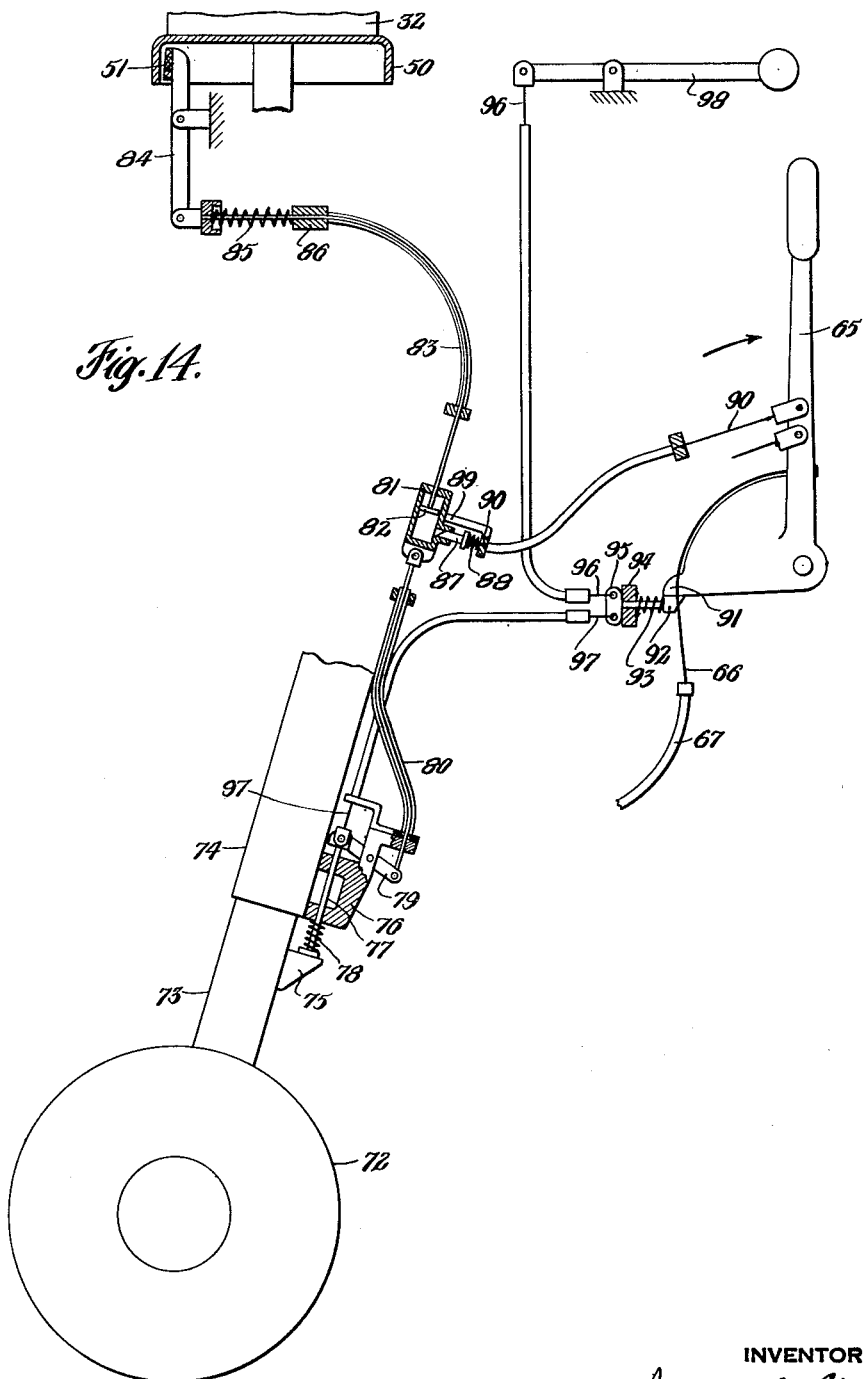

April 25, 1939.　　　J. DE LA CIERVA　　　2,155,409
AIRCRAFT WITH AUTOROTATIVE WINGS
Filed Jan. 15, 1936　　　14 Sheets-Sheet 10

INVENTOR
Juan de la Cierva
BY
Synnestvedt & Lechner
ATTORNEYS

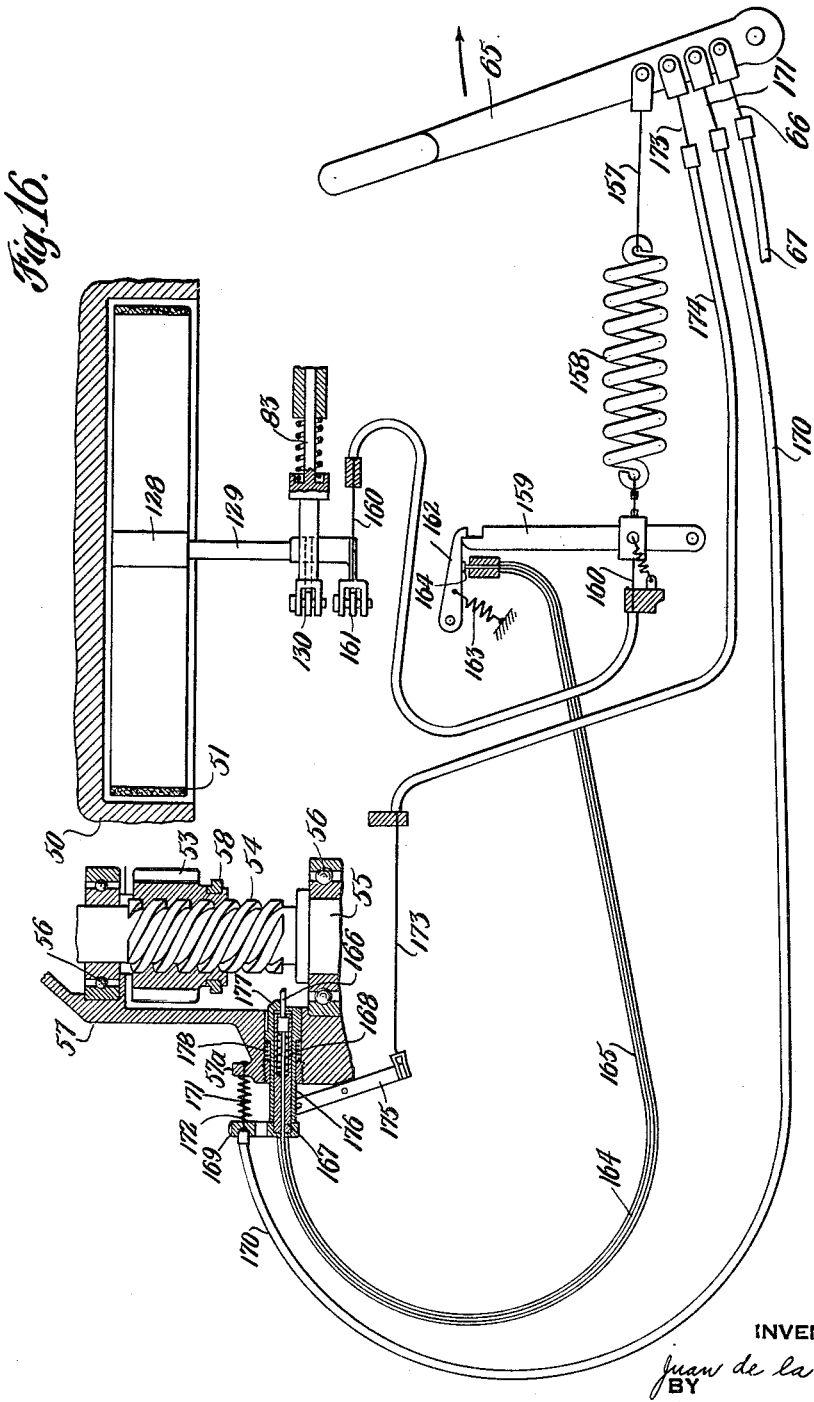

April 25, 1939.   J. DE LA CIERVA   2,155,409
AIRCRAFT WITH AUTOROTATIVE WINGS
Filed Jan. 15, 1936   14 Sheets-Sheet 12
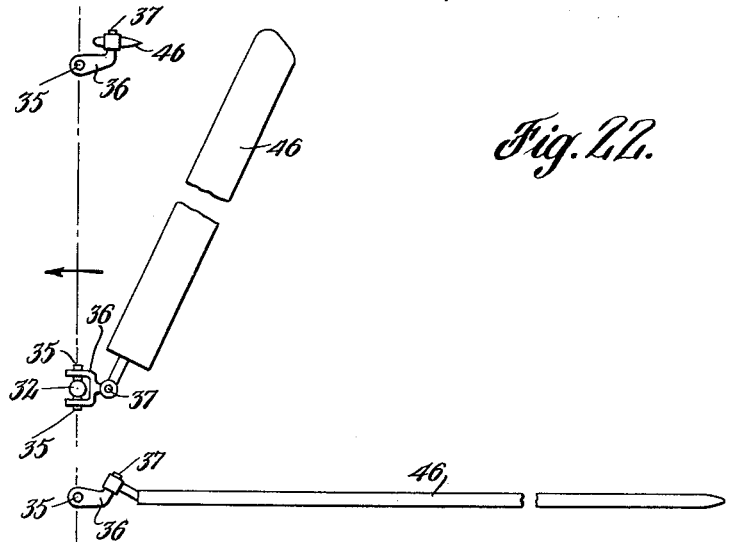
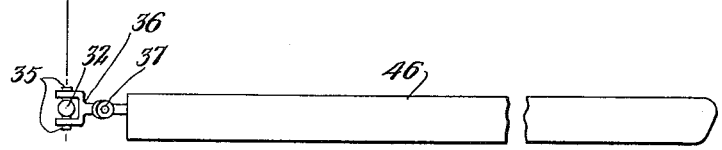
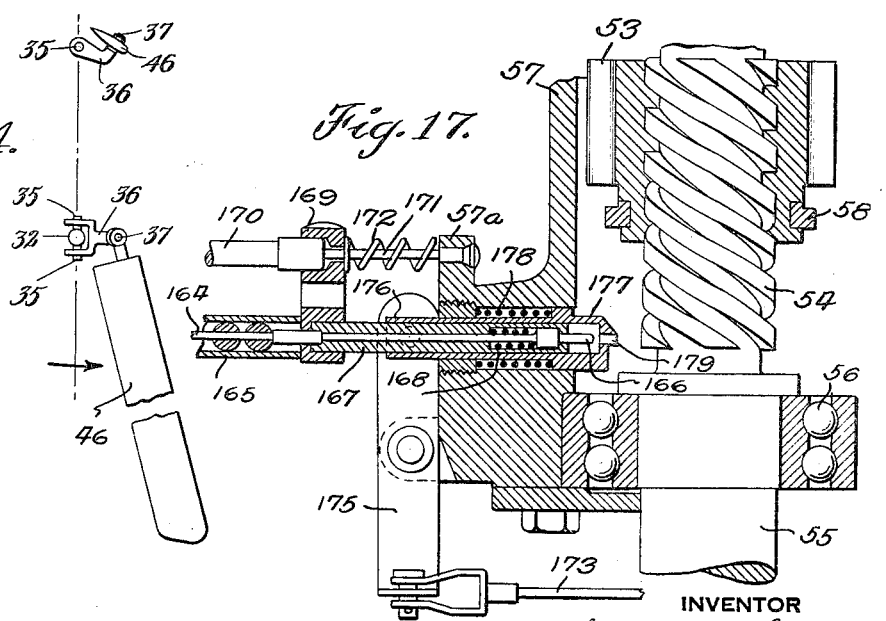
INVENTOR
Juan de la Cierva
BY
Synnestvedt & Lechner
ATTORNEYS

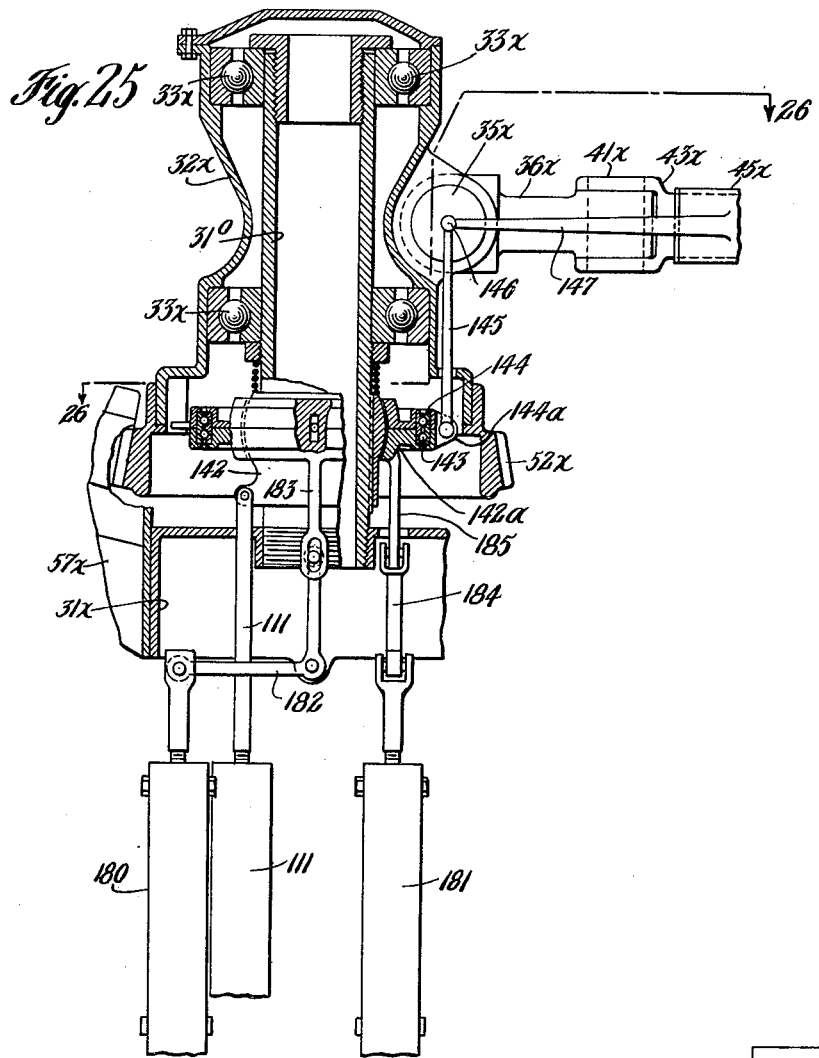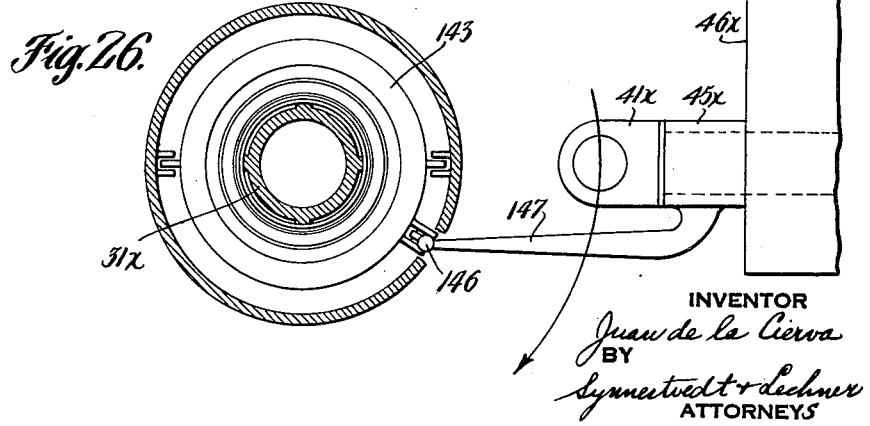

Patented Apr. 25, 1939

2,155,409

UNITED STATES PATENT OFFICE 2,155,409

AIRCRAFT WITH AUTOROTATIVE WINGS

Juan de la Cierva, Madrid, Spain, assignor, by mesne assignments, to Autogiro Company of America, a corporation of Delaware Application January 15, 1936, Serial No. 59,293
In Great Britain January 16, 1935

42 Claims. (Cl. 244—18)

The present invention relates to aircraft with autorotative wings, and to methods of operating the same, and is particularly useful in that type of craft wherein the principal means of support in flight consists of a system of rotative wings or blades, hereinafter referred to as a rotor, mounted for free rotation about a substantially vertical axis and adapted for autorotation in flight under the influence of the flight wind; and in which means of forward propulsion are provided comprising one or more engines driving an airscrew or airscrews or the like propulsive devices, together with means for imparting an initial rotation to the rotor, usually referred to as a rotor starter, which may comprise a disconnectible driving connection between the said engine and the rotor adapted to apply a torque to said rotor (as in Pecker U. S. Patent 1,999,636).

More particularly, the invention is especially adapted to aircraft having sustaining rotors of the kind referred to, in which the individual blades are attached to the hub or central member of the rotor by flexible or articular connections which permit each blade to swing up and down substantially in a plane containing the rotor axis. The purposes and advantages of the invention will be best understood after some consideration of the general state of this art.

In aircraft of the kind above described, the blades are generally attached to the hub each by at least two independent articulations allowing free or damped motion of the blades both in a plane approximately containing the axis of rotation of the rotor and in a plane approximately perpendicular to the rotor axis. These articulations may be referred to, respectively, as "flapping" hinges and "drag" hinges, the first being those around which all or the greater part of the blade oscillation takes place when the blade swings in a plane containing or parallel to the axis of rotation, and the second those around which all or most of the oscillation takes place when the blade swings in a plane perpendicular to the axis of rotation of the rotor or approximately fore-and-aft in the general path of rotation.

A further development of this type of craft, having an important relationship to the present invention, is disclosed in my prior British Patent Specification No. 420,322, and in the corresponding United States application, Serial No. 738,349, filed August 3, 1934, wherein there is described mechanism to enable aircraft of this kind to take-off without any run on the ground, the operation of which essentially consists in diminishing the pitch angle of the blades during the application of the starting torque by means of the rotor starter, to an angle corresponding substantially to the minimum aerodynamical (rotational) drag, and thereafter increasing the pitch angle, simultaneously with the declutching of the rotor starter transmission, to substantially the normal autorotational value suitable for forward flight. A take-off accomplished in this way, with little or no run may be conveniently referred to as a "direct" take-off.

Such aircraft may employ various expedients for controlling and regulating the rotor blade pitch angle, and the devices for this purpose fall naturally into two groups. In the first group, the pitch angle is positively regulated by mechanism controlled more or less independently of the forces acting on the rotor blades themselves, either manually by the pilot, (in which case the control may be rendered at least semiautomatic by the interposition of regulating devices), or else by means interconnected with other aircraft controls, e. g. the starter clutch or flying controls, as disclosed for example in my co-pending application No. 59,292 filed Jan. 15, 1936, or with other controls as disclosed more particularly hereinafter; the control of the pitch angle being at least semi-automatic in such cases.

The second group of pitch controlling and regulating devices comprise those in which the pitch angle is controlled in a fully automatic manner in accordance with the balance of forces experienced by the rotor blades themselves, i. e. the applied torque, centrifugal force, aerodynamic lift, drag and pitching moment and inertia forces and by the elastic characteristics of the rotor blades. Devices falling in this category may be referred to as "automatic".

The invention has reference to effecting improvements not only in the direct take-off as above defined but also in the landing of the aircraft. It is very desirable to destroy the lift of the rotor immediately on landing not only to prevent the aircraft from being blown off the ground again by a head gust or when landing against a strong wind, but also to counteract the effect of unintentional lateral "drift".

To accomplish this object I may employ means actuated by contact with the ground, water surface or other element or object, which means may be part of the mechanism supporting the aircraft at rest, for decreasing the pitch angles of the rotor blades to a small value, preferably zero, on landing.

The contact means may conveniently be associated with a part of the undercarriage of the vehicle (or with the hull or floats in the case of a water-borne aircraft). If the pitch controlling means belongs to the mechanical class as above defined, the pitch changing mechanism may be directly connected to an element mounted on the undercarriage and actuated by contact with the ground, etc.

On the other hand I may employ automatic pitch changing means operative to decrease the pitch angle on the application of a braking torque to the rotor and ground-contact-actuated means may be connected to a rotor brake in such a way as to throw a braking torque on the rotor on landing.

Another object of the invention is the provision of means for improving the direct take-off, more particularly with the end of safety in view. In performing a direct take-off with a rotor having automatic pitch changing means operative to increase the pitch angle of the blades on the vanishing of the starting torque, as for instance when the starter clutch is disengaged, a partial or complete failure of the power plant during the starting process while the clutch is still engaged may result in a premature unintentional take-off. Such an occurrence would in any case be inconvenient but is not in itself necessarily dangerous provided the flying controls are not mishandled, as the aircraft after expending its direct lift effort would sink to the ground again under control and without undue shock. If however the power plant were to "pick-up" again with the clutch still engaged while the aircraft was in the air, the pitch angle would immediately be decreased substantially to zero and a very heavy fall would result. It is therefore desirable at least to prevent such a dangerous possibility and preferably to prevent the aircraft from leaving the ground at all in the case of a failure, complete or partial, of the power plant.

With this end in view I may provide means operative on the failure (complete or partial) of the rotor starting torque, while the starter clutch is still engaged, to prevent the re-application of a substantial starting torque with the rotor blades set at a positive pitch angle or/and while the aircraft is off the ground.

In one preferred arrangement therefore I provide, in combination with automatic pitch changing means operative to increase the blade pitch angle on a diminution or vanishing of the starting torque, "throw-out" means for automatically disconnecting the starter transmission from the rotor on the failure (complete or partial) of the starting torque.

Alternatively, I may provide means actuated by contact with the ground etc., operative to disengage the starter clutch as soon as the aircraft becomes air-borne.

Such arrangements will not prevent a premature unintentional take-off on a failure of the power plant but will at least eliminate the really dangerous feature of such an occurrence, namely the possibility of a sudden re-application of torque when the aircraft is in the air.

In another preferred arrangement I may provide, in combination with means operative when the starter clutch is engaged to apply a braking torque to the rotor on the failure of the power plant, automatic pitch changing means responsive to the application of a braking torque to the rotor for decreasing the blade pitch angle. To enable the direct take-off to be accomplished the automatic pitch changing means must of course also be responsive to the application of the starting torque to decrease the blade pitch angle and as a decrease of pitch is therefore associated with the application of both starting and braking torques, the pitch angle will consequently have a maximum value corresponding substantially to zero applied torque.

In this arrangement the means for applying a braking torque to the rotor may include a suitable rotor brake or may utilise the power plant itself as the braking element, in which latter case the rotor starter transmission is adapted to maintain the rotor and power plant in reversible driving relation as long as the starter clutch is engaged (i. e. the rotor is not then capable of free-wheeling).

For decreasing the blade pitch angle responsively to the application of a braking torque I employ preferably a pivotal articulation of the rotor blade to the hub in which the disposition and particularly the angular relationships of the pivotal and structural axes are utilised to obtain the desired effect, as hereinafter more fully set forth, various modifications of pivotal dispositions for attaining the desired result being described.

It should be noted with reference to the claims that, unless otherwise qualified, each of the terms "reduction" and "failure", as applied to starting torque, is used broadly, so that either term comprehends either a diminution or a cessation of the starting torque, i. e. partial or total failure.

How the foregoing, together with such other objects and advantages as are incident to the invention, are obtained will be further evident after perusal of the following description of the structural embodiments of the invention illustrated in the accompanying drawings, wherein:

Figs. 1 to 3 are general views of an aircraft embodying the devices according to the first embodiment of the invention; Fig. 1 being in side elevation, Fig. 2 in plan and Fig. 3 in front elevation.

Fig. 4 is a detail view in sectional side elevation showing very diagrammatically the elements of the rotor starter clutch.

Fig. 5 shows in central longitudinal and vertical section the detail construction of the rotor head and blade root attachments.

Fig. 6 is a detailed view in section taken along the line 6—6 of Fig. 5.

Figs. 9 to 11 are somewhat diagrammatic representations of the rotor blade and blade root articulation as viewed from the rotor hub in the mean radial direction of the blade axis to illustrate the operation of the articulation stops; Fig. 9 shows the position of the parts with the blade in its limiting leading displacement on the double drag articulation; Fig. 10 shows the same with the blade in the mean radial position; and Fig. 11 the same with the blade in the limiting lagging position.

Figs. 12 to 15 show in diagrammatic manner, generally in side elevation, the mutual connections of the brake actuating mechanism, with the undercarriage, the clutch and the clutch releasing mechanism in four different positions; Fig. 12 showing the position of the parts in flight; Fig. 13 the position immediately after landing; Fig. 14 the position on engaging the clutch; and Fig. 15 the position on disengaging the clutch by the release mechanism.

Figs. 16 and 17 illustrate a modified arrangement in which a failure of the plant is utilised to apply the rotor brake; Fig. 16 being a somewhat diagrammatic representation in side elevation of parts of the rotor head and the controls connected therewith; and Fig. 17 a detail view of part of the same to a larger scale.

Fig. 18 shows somewhat diagrammatically in elevation a modification of the blade root articulation of Fig. 5.

Fig. 19 is a diagrammatic projection of the axes of the various parts as viewed in the direction of the arrow 19 in Fig. 18.

Fig. 20 shows a rotor head and blade articulation according to a second embodiment of the invention in side elevation, partly in section; Fig. 21 is a detail view in section taken along the line 21—21 of Fig. 20.

Figs. 22 to 24 show diagrammatically the rotor head and blade articulation of Fig. 20 in side elevation and in plan in three different positions; Fig. 22 showing the positions of the parts, when the blade has a pronounced leading displacement about the drag articulation; Fig. 23 showing the same when the blade is in normal mean radial position; and Fig. 24 the same when the blade has a pronounced lagging displacement. In each case the lower part of the figure is a showing in plan and the upper part a showing in side elevation.

Figure 27:
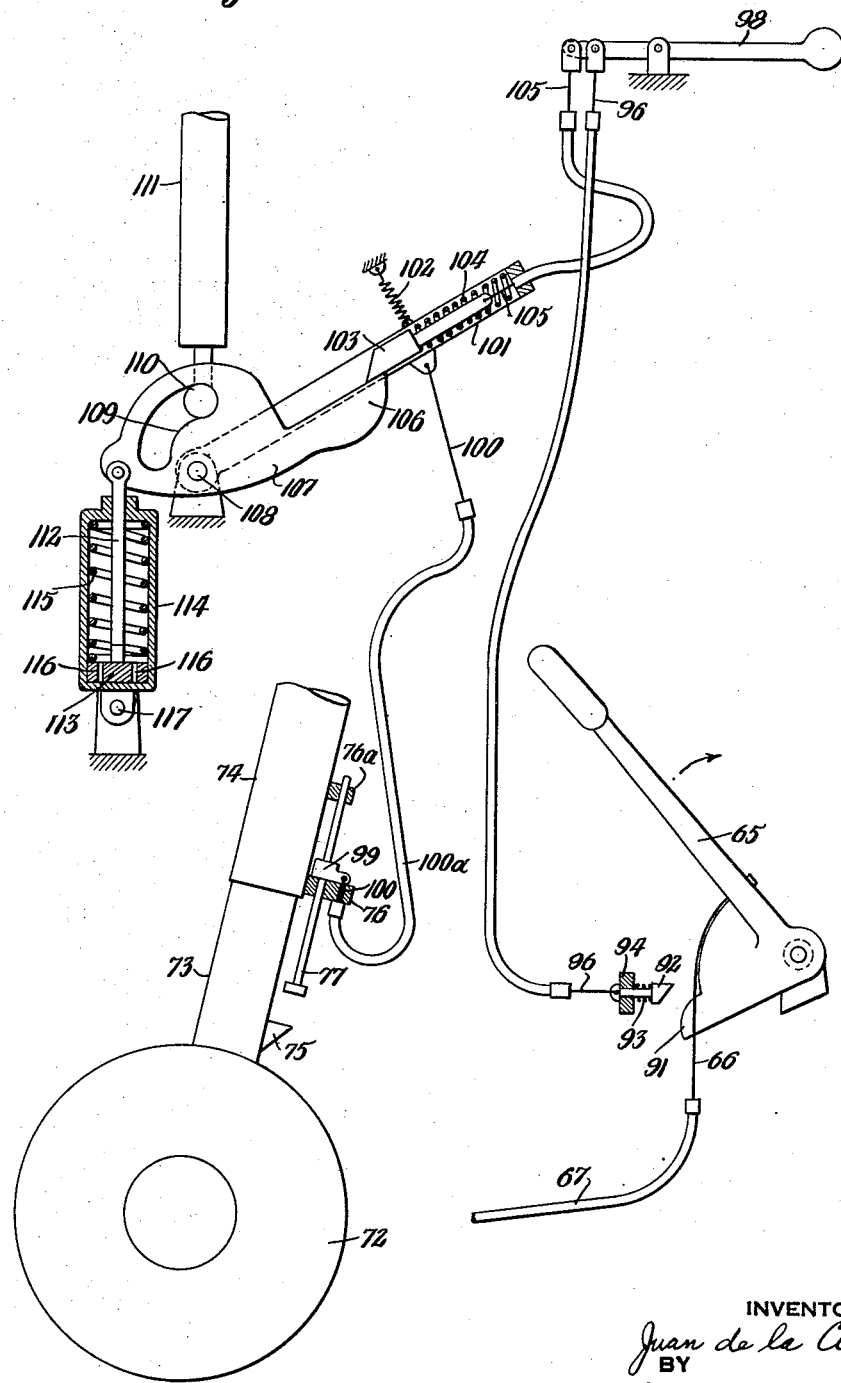

Figs. 25, 26 and 27 illustrate a third embodiment of the invention in which the rotor blade pitch angle is mechanically controlled; Fig. 25 being a view in central longitudinal vertical section of the rotor head; Fig. 26 a detail view in section taken along the line 26—26 of Fig. 25; and Fig. 27 a somewhat diagrammatic representation in side elevation of the connections of the pitch controlling mechanism, undercarriage and starter clutch.

The aircraft according to the first embodiment of the invention is illustrated in Figs. 1 to 3 and comprises a body 131, engine 132 and airscrew 133. The aircraft is further provided with an undercarriage structure comprising main wheels 72 mounted on telescopic shock absorbing struts 73, 74 and the usual radius rods 74a, 74b. A tail wheel 138 supports the rear of the aircraft on which are arranged vertical stabiliser fins 139, 139a and a horizontal stabiliser 140 with upturned tips 140a.

A rotor supporting pylon is composed of struts 130, 130a the upper ends of which are secured to an apex member 30 on which the rotor head assembly is universally pivoted, as shown, for example, in my copending application Serial No. 645,985, filed December 6, 1932, corresponding to British Patent No. 393,976, accepted June 16, 1933, being controllable by means of a hanging pilot's control lever 141. A two-bladed rotor is employed, the blades 46 being articulated to the rotor hub for flapping as shown by dotted lines in Fig. 1.

The control lever 141 is universally pivoted on a bracket mounted on the rotor supporting pylon and is connected, e. g. by a sliding ball and socket joint, to a short depending arm fixed to the rotor head assembly, so that rocking movements of the control lever are transmitted to the rotor head assembly in a reversed direction; a forward movement (clockwise in Fig. 1) of the control lever causing a forward tilt (counterclockwise in Fig. 1) of the rotor head assembly and similarly with reference to lateral movements.

A transmission mechanism from the engine is provided for imparting a starting torque to the rotor. This comprises a horizontal shaft 134 connected to the engine and an upright shaft 55 which is connected to shaft 134 by means of a clutch and gearing contained within a housing 135. The upper end of shaft 55 is connected by gearing with the rotor hub. The clutch is controlled by a lever 136 which is connected to a spring 137 which operates to bias the clutch to disengaged position and the lever 136 is connected to a hand lever 65 in the pilot's cockpit by means of a tension element 66 enclosed within a flexible sheath 67.

The details of the starter clutch and drive are further shown in Fig. 4 which illustrates in a diagrammatic manner the elements contained within the housing 135. Referring to Fig. 4 the shaft 134 drives shaft 55 through a clutch 148, 149 and a bevel gear pair 150, 151, the clutch member 149 being fast on the bevel pinion 150 and the clutch member 148 being slidable on the shaft 134 which is spigoted into the shaft of pinion 150. The clutch member 148 is slidable by means of a striking lever 153 engaging the groove of a collar 152 secured to the clutch member and lever 153 is connected by a link 154 with a crank 155 mounted on the shaft 156 of the external control lever 136.

The construction of the rotor head is shown in Figs. 5 to 8 and comprises a rotor axis member 31, connected to the apex member 30 by universal pivot means (diagrammatically shown in dotted lines in Figure 1) these forming per se no part of the present invention, same being broadly claimed in my above mentioned co-pending application No. 645,985. Rotatably mounted on the axis member 31 by bearings 33 is a rotor hub 32 terminating upwardly in brackets 34 supporting the flapping pivot pin 35 common to both the blades. Only one blade is shown in Fig. 5 for clearness.

The blade root assembly comprises a drag link 36 rotatable on the flapping pivot pin 35 and terminating in a drag pivot pin 37 whose axis $\phi$—$\phi$ is inclined upwardly and outwardly at an acute angle with a longitudinal blade axis $b$—$b$. On the pivot pin 37 is rotatably mounted by means of needle bearings 38 and bushings 39 a trunnion block 40 carrying a pair of trunnions 41 whose axis $\alpha$—$\alpha$ is inclined upwardly and inwardly with respect to the blade axis $b$—$b$. The axes $\alpha$—$\alpha$, $\phi$—$\phi$ are concurrent and coplanar, their common plane being vertical, i. e., perpendicular to the axis of the flapping pivot pin, said common plane also containing the blade axis $b$—$b$ when the blade is in its normal mean radial position. On the trunnions 41 are mounted by means of taper roller bearings 42 a forked member 43 terminating in a flange for attachment by means of studs 44 to the flanged root fitting 45 of the rotor blade.

The double drag articulation constituted by the pivot assemblies 37, 40 and 41, 43 is provided with stop means limiting the pivotal movements and comprising a rib 47 formed on the underside of the trunnion block 40. This rib engages between a pair of stops 48 formed on the underside of the drag link 36, 37 and also between a second pair of stops 49 formed on the lower jaw of the forked member 43 as shown more clearly in Fig. 6.

The driving shaft 55 of the rotor starter transmission is supported by means of bearings 56 in a housing 57 secured to the axis member 31 and terminates upwardly in a portion on which is formed a quick pitch thread 54. This portion carries a pinion 53 internally threaded for engagement with the shaft portion 54, whose thread is pitched in such direction that when the shaft 55 runs faster than the pinion 53 in the driving direction, the latter rises up the shaft portion 54.

Pinion 53 is adapted to engage a ring gear 52 secured to a drum 50 mounted on the lower part of the hub 32 and the inner face of the drum 50 is engageable with a rotor brake comprising a pair of brake shoes 51. The pinion 53 carries a friction collar 58 adapted to engage a pad 59 mounted on the inside of the housing 57. The friction engagement of the members 58, 59 serves to throw a drag on the pinion when the starter shaft 55 is rotated which will ensure the pinion rising up the shaft portion 54 to engage the ring gear 52. Below the pinion 53 is a thrust race 60 carried in a ring member 61 which is freely slidable in a vertical direction being provided with guide flanges 62 engaging in vertical slots 62a of the housing 57, see Figs. 7 and 8.

Figure 7:
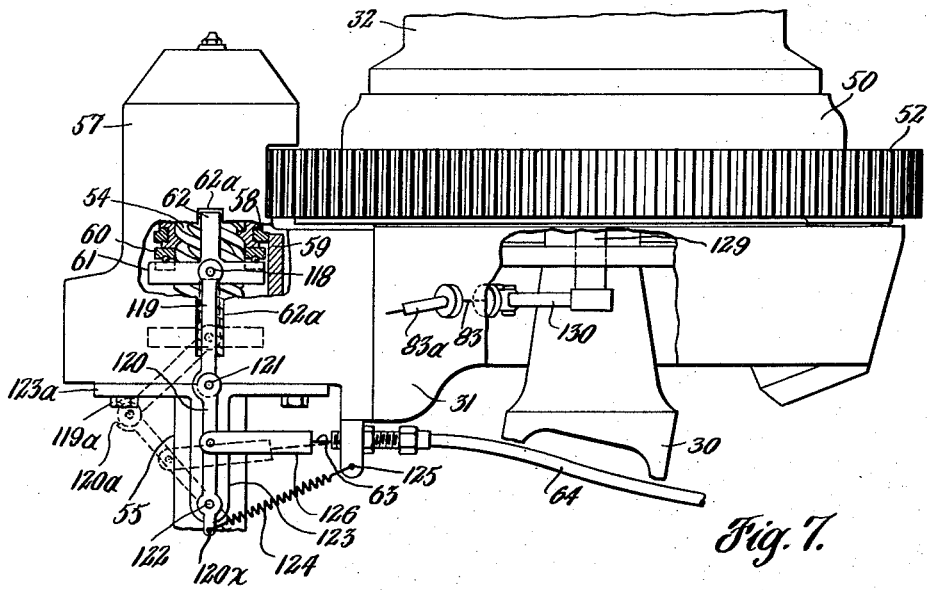
Fig. 7 is a view of the rotor head in side elevation, partly in section.

Referring more particularly to Fig. 7 the ring member 61 is further provided with pivots 118 articulating with a pair of jointed struts each consisting of links 119, 120 pivoted together at 121 and provided with projections 119a, 120a respectively which abut on one another and lock the jointed strut when it has just passed the dead point. The lower end of the links 120 are pivoted at 122 to brackets 123 formed on a plate 123a closing the lower end of the housing 57. The links 120 terminate downwardly in projections 120x to which are attached tension springs 124 anchored to the housing 57 at 125 and the links 120 are connected to a stirrup 126 to which is connected a tension transmitting element 63 enclosed in a flexible sheath 64 and attached at its other end to the clutch operating lever 65.

The operation of the last described device is as follows: When the lever 65 is moved in a clockwise direction to engage the starter clutch by means of the flexible connection 66, 67, the engagement of the clutch causes the rotation of the engine to be transmitted to the shaft 55 and the screw threaded connection between the shaft part 54 and the pinion 53 causes the latter to rise up the shaft and engage the ring gear 52, any tendency of the pinion 53 to fail to rise being prevented by the frictional engagement of the parts 58, 59 which cause the pinion to lag slightly as already mentioned.

At the same time tension is transmitted by the element 63 to the stirrup 126 which erects the jointed strut 119, 120 against the tension of spring 124. The lengths of the tension elements 63, 66 are so proportioned that an initial engagement of the clutch takes place before the erection of the jointed strut begins, so that any tendency to jam the pinion 53 against the threads 54 before the shaft 55 starts to rotate is avoided.

When the clutch lever 65 is in the fully engaged position it is retained by catch means hereinafter described and in this position the strut 119, 120 is fully erected and locked, having slightly passed the dead point. The pinion 53 is thus prevented from descending the shaft 54 as long as the clutch is engaged and should the power plant fail with the clutch in engagement, the rotor will drive the power plant through the ring gear 52, pinion 53, shaft 55 etc. and the compression of the power plant and its internal friction will throw a braking torque on the rotor. When, however, the clutch is disengaged the tension on the element 63 will be released and springs 124 will cause jointed struts 119, 120 to collapse. At the same time on the disengagement of the clutch the continued rotation of the rotor carrying with it the ring gear 52 and pinion 53 will cause the latter to overrun the shaft 55 and the threaded connection of the pinion with the shaft portion 54 will cause the pinion to descend thus throwing it out of gear with the ring gear 52. The threaded engagement of the pinion 53 and shaft portion 54 thus constitutes a throw-out device for disengaging the transmission when the rotor overruns, but this throw-out device is rendered inoperative, as long as the clutch is in engagement by the jointed strut means 119, 120. On the failure of the power plant, the driving load is transmitted from the pinion 53 to the shaft 55 in the reverse direction and the threaded engagement of the pinion 53 with the shaft portion 54 causes a heavy download on the pinion, but this is transmitted through the thrust bearing 60, ring member 61 and the jointed strut assembly 119, 120 to the bracket 123 and throws no load on the operating gear 126, 63 or on the springs 124. At the same time the jointed strut can be "broken" by means of a small load applied by the spring 124 and similarly can be erected by a small load applied through the stirrup 126.

Referring to the rotor blade articulation (Fig. 5), because of the acute angle or relative inclination of the blade axis b—b and the pivot pin 37 ($\phi$ axis) it results that movement of the trunnion block 40 and the blade 45, 46, about the axis of pin 37 is associated with a change of pitch in the direction that the pitch decreases with a lagging of the blade from the mean radial position and increases as the blade passes from a lagging to a leading attitude, provided that no movement takes place about the $\alpha$ axis. On the other hand, the opposite inclination of the $\alpha$ axis (pivot 41) is associated with a change of pitch angle in the opposite sense, i. e. that movement of the blade from a lagging to a leading attitude is associated with a decrease of pitch provided there is no movement about the $\phi$ axis. If movement takes place about both $\alpha$ and $\phi$ axes equally, the changes of pitch associated with movements about these axes neutralizes one another and there is substantially no alteration in pitch. The arrangement shown is such that pronounced lagging displacements of the blade from the mean radial position are associated with progressive decrease of pitch angle and pronounced leading displacements are also associated with progressive decrease of pitch so that when a braking torque is applied to the rotor hub and the blades swing forwards (leading) from their mean radial position, the pitch is decreased whereas when a driving torque is applied and the blades lag, the pitch is also decreased. There is thus a limit to the maximum pitch attainable occurring when the blade is at or near its mean radial position. The above result is obtained by a suitable disposition of the blade articulation stops 47, 48, 49 as will hereinafter be shown.

Figure 8:
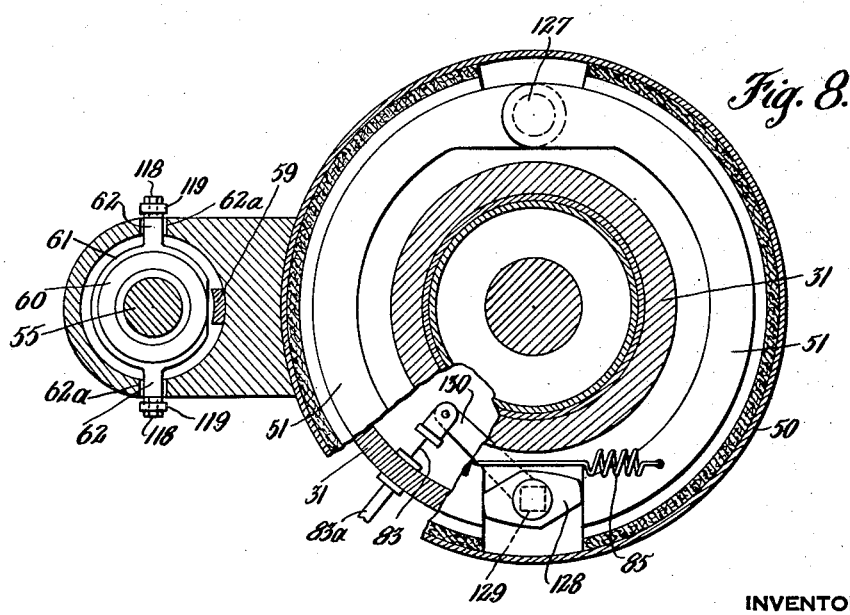
Fig. 8 is a view in section taken along the line 8—8 of Fig. 5.

The rotor brake actuating means are shown more particularly in Fig. 8 from which it will be seen that the brake shoes 51 are pivoted together at 127 and are expandable by means of a cam 128 mounted on a vertical shaft 129 carrying at its lower end a lever 130 actuated by a tension transmitting element 83 enclosed within a sheath 83a, the brake shoes being returnable to the "off" position by means of a tension spring 85.

The operation of the blade articulation stops 47 to 49 is shown more clearly in Figs. 9 to 11. Fig. 10 shows the rotor blade 46 in its mean radial position and it will be seen that the rib 47 has a clearance from all the stops 47 to 49 so that for small displacements of the blade on either side of this position movement takes place about both pivots 37, 40 ($\phi$) and 41, 43 ($\alpha$) and as movements about these two pivots respectively are associated with opposite changes of pitch the blade pitch angle remains substantially unaffected for displacements within this range.

For more extended leading displacements of the blade, movement about the $\phi$ pivot 37, 40 is prevented by engagement of the rib 47 with the forward stop 48 of the pin 37, so that such further leading displacement takes place about the $\alpha$ axis only by movement of the member 43 on the pin 41 with a consequent decrease of pitch angle. Movement of the blade in this direction is finally limited by engagement of the forward stop 49 of the member 43 with the rib 47.

On the other hand an extended lagging displacement of the blade takes place about the $\phi$ axis only, movement about the $\alpha$ axis being prevented by engagement of the rear stop 49b of the member 43 with the rib 47, thus causing the extended lagging displacement to take place by movement of the trunnion block 40 about the pin 37. Thus the extended lagging movement is also associated with a decrease of pitch. The lagging of the blade is finally limited by engagement of the rib 47 with the rear stop 48b of the pin 37, as shown in Fig. 11.

Referring to Figs. 12 to 15; the undercarriage elements shown comprise a supporting wheel 72 mounted on the telescopic strut 73, 74 containing the usual springing and shock absorbing devices (not shown). The upper part 74 is fixed to the body of the aircraft. On the sprung part 73 of the telescopic strut is mounted a projection 75 and the fixed part 74 carries a guide bracket 76 in which is slidable a plunger 77 loaded in a downward direction by a spring 78 and adapted to be engaged by the projection 75. The plunger 77 is connected to one end of a lever 79 pivoted on the bracket 76, the other end of which lever is connected to the movable element of a flexible motion transmitting device 80 capable of operating in compression as well as in tension. The other end of the movable element of the transmission 80 is connected to a cylinder 81 within which is slidable a piston 82 connected to the movable element of a second flexible tension and compression transmitting device 83, the other end of the movable element of the transmission device 83 being connected to the rotor brake actuating mechanism diagrammatically represented by a lever 84, the brake itself being diagrammatically represented by a drum 50 carried by the rotor head 32 and a shoe 51 carried by lever 84. The brake is biassed to disengaged position by means of a spring 85 acting on an abutment 86.

In the wall of the cylinder 81 is mounted a slidable catch 87 biassed to a position of engagement with the piston 82 by a spring 88 acting against an abutment 89 mounted on the cylinder 81. The slidable catch 87 is connected by means of a flexibly sheathed tension transmitting element 90 to the clutch engaging lever 65 which, as already described in connection with Figs. 1 to 3, is connected to the clutch by means of the tension element 65 of the transmission device 66, 67. On the clutch lever 65 is mounted a projection 91 adapted to engage with a slidable catch 92 biassed by means of a spring 93 acting against an abutment 94 to a position of engagement with projection 91. On the catch 92 is mounted a yoke 95 to which are connected flexibly sheathed tension elements 96, 97, the other end of cable 96 being attached to a hand lever 98 and the other end of cable 97 to the plunger 77 associated with the undercarriage. The direction of movement of lever 65 for engaging the clutch is shown by an arrow.

Fig. 12 shows the parts in the position which obtains in flight. The telescopic strut 73, 74 is fully extended and the projection 75 is clear of the plunger 77. There is therefore no tension applied to the movable elements of the flexible transmissions 80, 83 and the spring 85 is therefore free to release the brake 51. The clutch lever 65 is in disengaged position and the sliding catch 87 is engaged behind the piston 82.

When the aircraft lands (see Fig. 13) the load on the wheel 72 drives the sprung part 73 of the telescopic undercarriage strut up into the fixed part 74 and the projection 75 engages the plunger 77 and drives it up against spring 78. The movement of the plunger 77 rocks the lever 79 and tensions the movable elements of the transmission 80, 83 which actuate the lever 84 to apply the brake 51 against the load of the spring 85.

When it is required to engage the clutch for starting the rotor again preparatory to taking-off, it is necessary to release the rotor brake and this is effected (as shown in Fig. 14) by the withdrawal of the plunger 87 by the tension element 90 on the movement of the clutch engaging lever in the direction of the arrow. The withdrawal of plunger 87 releases the piston 82 to travel up the cylinder 81. This allows the effective combined length of the movable elements of the transmission 80, 83 to increase, thereby allowing the spring 85 to release the brake 51.

Figure 15:
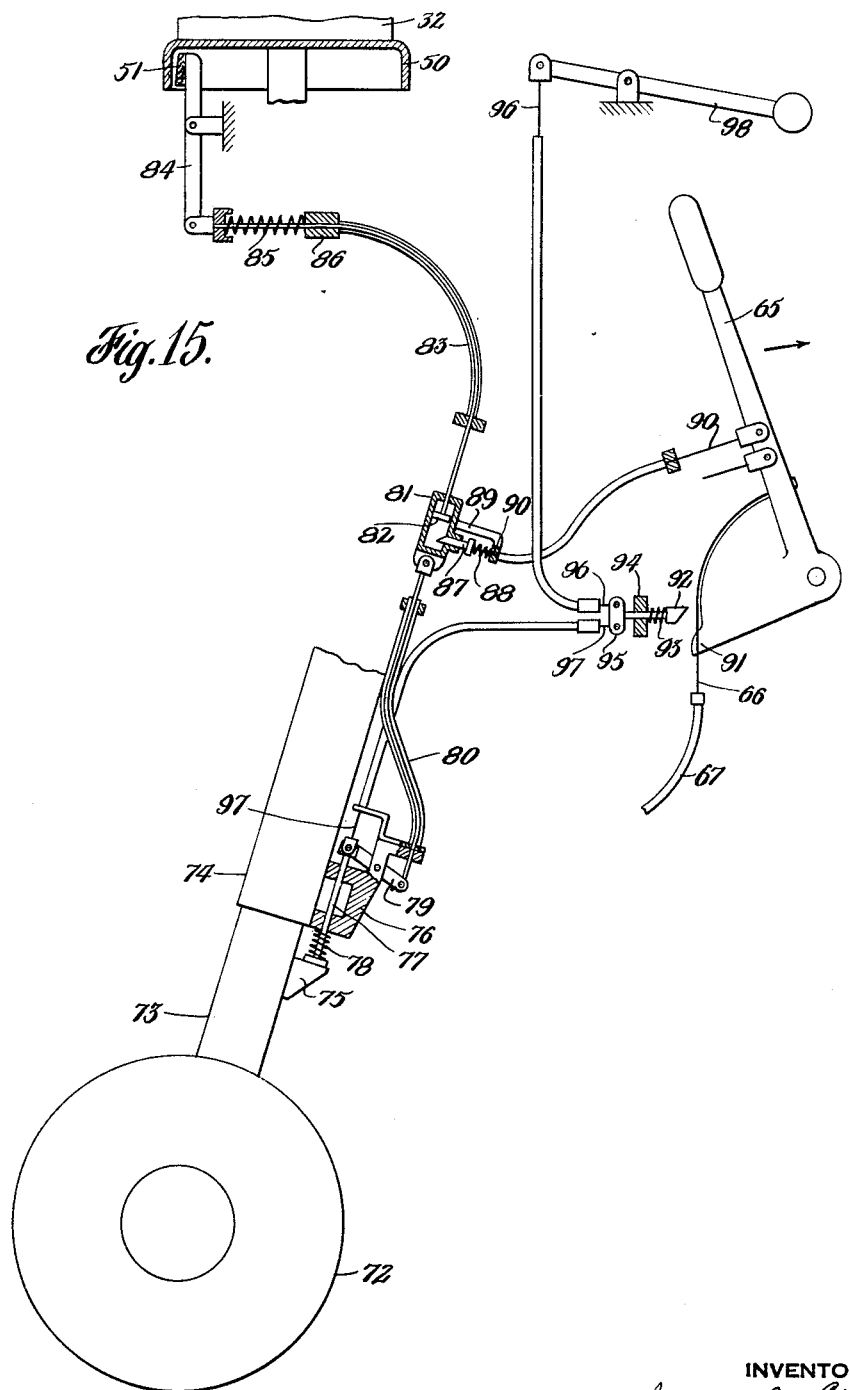

In Fig. 14 the clutch is shown fully engaged and in this position the projection 91 springs over the catch 92 and the clutch lever is thereby locked in the engaged position. When it is desired to release the clutch again the knob of the hand lever 98 is pressed down (as shown in Fig. 15). This actuates the tension element 96 to withdraw the catch 92 from the projection 91, thus allowing the clutch to disengage. The movement of the lever 65 to clutch disengaging position allows the plunger 87 to be returned by its spring 88 to its operative position, in which it can engage the piston 82. As soon as the machine becomes airborne the parts 77, 79, 80 and 81 are returned to the position shown in Fig. 12 by the action of the spring 78. In this movement the motion transmitting element of the transmission 80 operates in compression. As the motion transmitting element of the transmission 83 cannot move any further in the brake disengaging direction, relative movement takes place between the cylinder 81 and piston 82 bringing them back into the configuration shown in Fig. 12, the piston 82 springing over the catch 87 and engaging therewith so as to be locked at the bottom of the cylinder 81.

The mechanism shown in Figs. 12 to 15 also ensures that if the aircraft leaves the ground unintentionally while the clutch is engaged the clutch will immediately and automatically be disengaged. This is effected by means of the connection between the plunger 77 and the catch 92. When the aircraft leaves the ground the downward movement of the plunger 77 is transmitted by the tension element 97 and the yoke 95 to the catch 92, which is thereby withdrawn from engagement with the projection 91 and allows the clutch to disengage immediately.

In the modification of Figs. 16 and 17 the clutch lever 65 is connected by means of a tension cable 157 to a spring 158 which is shackled to a lever 159 connected by a flexibly sheathed tension element 160 to an auxiliary brake actuating lever 161 mounted on the cam shaft 129 of the brake 51. The end of lever 159 is engageable by a hook 162 biased to engaging position by a spring 163 and disengageable by the pressure of a flexible motion transmitting element 164 operative in compression, which is contained within a flexible sheath 165 and carries at its other end a striker 166 adapted to project within the housing 57 in the path of the pinion 53. The striker 166 is slidable within a sleeve 167 and is biassed to a position of engagement with the pinion 53 by a spring 168. Sleeve 167 is secured to a block 169 which acts as an abutment for the sheath 165 and for a flexible sheath 170 enclosing a cable 171 anchored to a lug 57a of the housing 57, the other end of the cable 171 being attached to the clutch lever 65. A compression spring 172 is set between the abutments 169 and 57a and acts to bias the whole assembly 169, 167, 165 and 166 in a direction to withdraw the striker 166 from engagement with the pinion 53.

To the clutch lever 65 is also connected a tension element 173 enclosed in a flexible sheath 174 and attached at its other end to a lever 175 pivoted on the housing 57 and the other end of lever 175 is connected to a sleeve 176, within which the sleeve 167 is slidable. Sleeve 176 is slidably mounted in the housing 57 and carries at its end a catch 177 which is biassed by a spring 178 to project within the casing 57, in which position it will engage the collar 58 mounted on the pinion 53 and retain the latter in its lowest position and prevent it from rising up the threaded portion 54 of shaft 55 to engage the ring gear 52 mounted on the rotor hub (see Fig. 5).

The operation of this device is as follows:—

Starting from the position in which the clutch is disengaged and the pinion 53 is in its lowest position and retained thereby by the catch 177, movement of the clutch lever to engaged position acting through the tension connection 173 rocks lever 175 counter-clockwise and withdraws the catch 177, thus releasing the pinion to rise up the threaded portion 54 of the shaft 55 to engage the ring gear 52 of the rotor hub. At the same time a tension is applied to the cable 171, which is thereby moved relatively to its sheath 170 in such a way as to shorten the length of cable protruding from the sheath 170 and anchored at 57a. In this way the abutments 169 and 57a are drawn together against the compression of the spring 172, but as the abutment 57a is fixed the abutment 169 carrying with it the sleeve 167 is moved inwards towards the housing 57. The inward movement of sleeve 167 is transmitted by spring 168 to the striker 166 which is thus caused to project from the catch 177 through an orifice 179 provided therein into engaging relation with the pinion 53. The lengths of the various control members are so selected that on moving the lever 65 to engaging position the striker 166 is only moved into a position for engagement with the pinion 53 after the catch 177 has been withdrawn and the pinion released. Similarly on returning the clutch lever to disengaged position the striker 166 is first withdrawn and then the catch 177 moved into engaging position to retain the pinion when it descends. It will also be noted that the correct functioning of this mechanism requires that the ends adjacent the clutch operating lever 65 of the sheaths 170, 174 (as also of the sheath 67 of the clutch engaging element 66) be secured in fixed abutments, but as this is the regular practice the abutments have not been shown in the drawings.

The engaging movement of the clutch lever further operates through a tension member 157 to tension the spring 158, the lever 159 being retained against movement by the hook 162.

If now during the application of the starting torque the power plant fails completely or partially, so that the rotor tends to overrun the driving shaft 55, the relative rotation of pinion 53 and shaft 55 will cause the pinion to descend the threaded portion 54 of the latter and engage the striker 166 which is thereby moved to the left in Figs. 16, 17 and its motion is transmitted by the element 164 acting in compression to the hook 162 so as to move the latter against the tension of spring 163 and thereby release the lever 159. The release of the lever 159 allows the tension of spring 158 to be applied through the tension connection 160 to the lever 161, which thereupon applies the brake 51. As the force for applying the brake is derived from the movement of the clutch lever 65, the return of the latter to the clutch disengaging position immediately releases the brake and the consequent return of the abutment members 169, 167 to their initial position allows the transmission element 164 to move relatively to the sheath 165 under the action of spring 168 into its original position, thus allowing the spring 163 to re-engage the hook 162 of the lever 159. It will be noted that as the brake actuating connection 160 only operates in tension, the above described devices do not prevent the application of the brake in the ordinary way by the tension cable 83 and lever 130 when the connection 160 is inoperative.

Figs. 18 and 19 illustrate a modification of the blade root articulation. In the arrangement of Fig. 5 the axes of the pivot pins 37, 41 ($\phi$ and $\alpha$ axes) are situated in the plane of the drawings, i. e. the plane containing the rotationtal axis and the longitudinal axis of the blade, the blade being in its normal radial position.

In Fig. 18 the axes of the pivots 37, 41 lie in a plane containing the longitudinal blade axis (when in the normal radial position) but inclined at an acute angle to the rotational axis. This is indicated in Fig. 18 by the perspective appearance of the assembly 37 to 43, the rotational axis being indicated by the line O—O and the direction of rotation by the arrow R.

In Fig. 19 the various axes are projected on a plane through the plane containing the rotational axis O—O and the axis $\delta$—$\delta$ of the flapping pivot 35, the blade being in its normal radial position. In this figure the outline of the rotor blade section as projected on this plane is indicated at 46 and the plane containing the axes of the pivot pins 37, 41 cuts the plane of the projection in the line $\phi$—$\alpha$ which is inclined at an acute angle to the rotational axis O—O, the inclination being backwards and upwards with respect to the direction of motion of the blade.

Figs. 20 to 24 illustrate a second embodiment of the invention incorporating an alternative form of rotor head.

Referring to Fig. 20; the rotor hub 32 in this case is adapted for a three-bladed rotor, but the number of blades is immaterial for the purposes of the present invention. The hub 32 terminates upwards in bracket lugs 34 supporting the flapping pivot pins 35. On the flapping pivot pin is articulated a drag link 36 terminating in a drag pivot pin 37 which projects upwardly above the flapping pivot so that its axis $\phi$—$\phi$ passes close to the axis of the flapping pivot which itself is mounted as near as possible to the rotational axis. On the drag pivot pin 37 is rotatably mounted by means of taper roller bearings 38a a drag pivot housing 43a terminating in a flange for attachment to the flanged root fitting 45 of the rotor blade 46a. The drag pivot axis $\phi$—$\phi$ is inclined upwardly and outwardly with respect to the longitudinal blade axis b—b and the intersection of the drag pivot and blade axes $\phi$—$\phi$, b—b is, by reason of the construction above set forth, much closer to the rotational axis than in the constructions hitherto usual in aircraft of this kind. Movement of the blade about the drag pivot is limited by stop means shown more clearly in Fig. 21. These comprise threaded studs 69, 69a screwed into lugs 68, 68a formed on the drag pivot housing 43a and a flange 71 formed on the drag link 36 and situated between the inner ends of the studs 69, 69a. The latter are adjustable by screwing in and out of the flanges 68, 68a and are provided with locking nuts 70, 70a.

Owing to the small offset between the intersection of the $\phi$ and b axis from the rotational axis, relatively large blade displacements about the drag pivot are required to bring into play centrifugal restoring moments of appreciable magnitude and as the drag pivot axis $\phi$—$\phi$ is upwardly and outwardly inclined to the blade axis b—b at a much larger angle than has been hitherto usual, the changes of pitch angle associated with blade movements about the drag pivot are relatively small so that large blade displacements about the drag pivot are necessary to bring about appreciable changes of pitch.

The operation of this arrangement is diagrammatically shown in Figs. 22 to 24. In Fig. 23 the blade is shown in plan (below) and elevation (above) in its normal mean radial position, the pitch angle (not shown) being in this case the usual moderate positive pitch angle required for autorotative flight.

Fig. 22 shows the effect of a pronounced leading displacement of the blade on the drag pivot, the direction of rotation being shown by an arrow. Owing to the inclination of the drag pivot to the blade axis this leading displacement results in an increase of pitch angle, but the lift produced thereby causes an upward displacement of the blade and drag link about the flapping pivot and this has the effect of decreasing the pitch angle again, as shown in the upper part of Fig. 22. By a suitable choice of the offset and inclination of the drag pivot this effect can be made substantially to neutralise the increase of pitch following the leading displacement on the drag pivot.

On the other hand in the case of a pronounced lagging displacement of the blade on the drag pivot the decrease in pitch resulting therefrom gives rise to a loss of lift, which has the effect of depressing the blade and drag link about the flapping pivot, thus tending to decrease the pitch angle still further, as shown in the upper part of Fig. 24. For this reason the lower stops of the flapping pivot must be positioned to prevent downward flapping movement and consequent excessive decrease of pitch, which would throw heavy downward loads on the blades. These lower stops are shown in Fig. 20 at 34x, 36x.

If the mass distribution and aerofoil profile of the blade are such that, for small angles of blade incidence at least, the pitching moment coefficient of the blade about its mass centre is in a direction tending to decrease the pitch, the drag pivot axis may be made almost or absolutely at right-angles to the blade axis. If in this case the offset of the drag pivot is small enough, the application of a starting torque to the rotor hub will cause the blade to lag through a very large angle, which may approximate to 90°, and the component of the blade pitching moment about the flapping pivot axis will be large and will cause a movement about the flapping pivot resulting in a decrease of pitch.

On the other hand the application of a braking torque to the rotor hub will give rise to a large leading displacement of the blade and the moment of the lift about the flapping pivot will act to decrease the pitch angle and reinforce the effect of the pitching moment. In the normal radial position however the pitching moment will have no appreciable component about either the drag pivot axis or the flapping pivot axis and the pitch angle will remain unaffected except for the residual effect of the torsional elasticity of the blade.

A third embodiment of the invention utilising a rotor with mechanically controlled pitch angle is illustrated in Figs. 25 to 27.

The rotor head shown in Fig. 25 comprises a fixed apex member 31x carrying a tubular upward extension 31o on which is mounted by means of bearings 33x a rotor hub 32x carrying at its lower end the usual driving ring gear 52x engageable by a pinion (not shown) within the housing 51x. The hub 32x is provided with lugs supporting the flapping pivot pins 35x on which are rotatable the drag links 36x carrying drag pivot pins 41x on which are articulated fork-ended blade root fittings 43x. The roots 45x of the blades are rotatable on the root fittings 43x for variation of pitch angle by mechanism consisting of an operating rod 111, a sleeve 142 slidable on the axle member 31o, a collar 142a mounted on sleeve 142, a ring 144 rotatably mounted on collar 142a by means of bearings 143 and having lugs 144a to which are universally articulated rods 145 which are universally pivoted at 146 to levers 147 secured to the blade roots 45x.

When the rod 111 is raised or lowered the assembly 142, 142a, 143, 144, 144a is raised and lowered with it and the rods 145 transmit this movement to the levers 147 which vary the pitch angle of the blades. The disposition of the levers 147 is shown more clearly in Fig. 26, which also indicates the inner part of the blade at 46x and shows the direction of rotation by means of an arrow.

In order that the blade pitch angle shall not be affected by the flapping, the pivot 146 connecting rod 145 with lever 147 is situated on the axis of the flapping pivot pin 35x when the pitch angle has its normal flying value, as shown in Fig. 25.

In the rotor as shown in Fig. 25, control in flight is obtained by differentially varying the blade pitch angles by rocking the collar 142a on the sleeve 142 by means of rods 180, 181 and linkages 182, 183 and 184, 185, the collar 142a being mounted on the sleeve 142 by means of a spherical joint. As this mechanism forms no part of the present invention it will not be further described. The mechanism in question is described and claimed in my co-pending application Serial No. 698,372, filed November 16th, 1933, and in the corresponding British Patent No. 410,532, accepted May 24th, 1934.

The connections of the mechanism for varying the pitch angle of all the blades together are shown in Fig. 27. The rod 111 terminates in a stud 110 engaging in a cam-shaped slot 109, formed in a cam plate 107 pivoted at a fixed point 108 and terminating in a projection 106. The cam plate 107 is actuated by a damped spring assembly 112 to 117 comprising an oil-filled cylinder 114 anchored at a fixed point 117 and containing a piston 113 loaded by a spring 115. Attached to the piston is a rod 112 guided in the cylinder 114 and pivoted to the cam plate 107 and the piston is also provided with orifices 116 which act to throttle the oil in its passage from one side of the piston to the other as the latter moves along the bore of the cylinder.

The hand lever 65 is connected by means of a flexible transmission 66, 67 to the rotor starter clutch, as already described with reference to Fig. 1 and is provided with a projection 91 engageable by catch mechanism 92, 93, 94 releasable by a hand lever 98 through a flexible transmission element 96, as already described. As before, 73, 74 is a telescopic undercarriage strut carrying a landing wheel 72 on the movable member 73 of the telescopic strut and the fixed part 74 of the strut carries guide brackets 76, 76a in which is slidable a plunger 77 engageable by a projection 75 mounted on the movable part 73 of the telescopic strut. Secured to the plunger 77 is a block 99 to which is attached one end of a tension transmitting element 100 enclosed within a sheath 100a abutting against the guide bracket 76. The other end of the tension element 100 is connected to a lever 101 pivoted at 108 about the same axis as the cam plate 107 and biased by a tension spring 102. Slidably mounted in the lever 101 is a catch 103 biased to a position for engaging projection 106 of the cam plate 107 by a compression spring 104 and withdrawable by means of a flexibly sheathed tension transmitting element 105, the other end of which is connected to the hand release lever 98.

It may be noted that the direction of rotation of the rotor is the opposite of that shown in Figs. 2, 18 and 22 to 24, but this is immaterial as far as the present invention is concerned.

In Fig. 27 the parts are shown in the position obtaining in flight. The action of spring 115 on the piston 113 has rocked the cam plate 107 in a counter-clockwise direction until the stud 110 engages the right hand end of slot 109, in which position the rod 111 is raised to its fullest extent, and by reference to Figs. 25 and 26 it will be seen that this corresponds to the maximum pitch angle of the blades.

When the aircraft lands the projection 75 strikes the plunger 77 and drives it upwards, carrying with it the block 99, which applies a tension to the element 100 to rock the lever 101 clockwise and with it the cam plate 107 by reason of the engagement of catch 103 with projection 106. The clockwise rotation of the cam plate causes the stud 110 to travel along the slot 109, thus moving the rod 111 downwards and thereby decreasing the pitch angle of the blades to its minimum value, which is approximately zero.

When it is desired to take-off again the starter clutch is engaged by moving the lever 65 in the direction of the arrow and when the clutch is fully engaged the catch 92 engages the projection 91 and locks the clutch in engagement.

When it is desired to disengage the clutch for taking-off the knob of the hand lever 98 is pressed down, thus disengaging the catch 92 from the projection 91 by means of the tension connection 96 and releasing the clutch for movement to disengaged position under the action of its own spring. At the same time the catch 103 is disengaged from the projection 106 by means of the tension connection 105 and the pitch angle is thereupon automatically increased by the spring 115 acting through the elements 113, 112 on the cam plate 107, slot 109, stud 110 and rod 111, the rate of pitch increase being automatically determined by the amount of damping provided by the orifices 116 in the piston 113 and the viscosity of the oil contained in the cylinder 114.

As soon as the aircraft leaves the ground the telescopic strut 73, 74 extends to its greatest length and the projection 75 releases the plunger 77, and connections 99, 100, thus allowing the bias spring 102 to rock the lever 101 counterclockwise until the catch 103 re-engages the projection 106 under the action of its bias spring 104, the pilot having meanwhile released the knob of the lever 98.

What I claim is:

1. In an aircraft sustaining rotor, a hub, a blade and pivots connecting the blade with the hub, the pivots including one having its axis angled upwardly and outwardly with reference to the longitudinal blade axis and another having its axis angled upwardly and inwardly with reference to the longitudinal blade axis.

2. In an aircraft sustaining rotor, a hub, a blade, and pivots connecting the blade with the hub, the pivots including one having its axis angled upwardly and outwardly with reference to the longitudinal blade axis and another having its axis angled upwardly and inwardly with reference to the longitudinal blade axis, the axes of the two pivots lying substantially in the same plane.

3. In an aircraft sustaining rotor, a hub, a blade, and pivots connecting the blade with the hub, the pivots including one having its axis angled upwardly and outwardly with reference to the longitudinal blade axis and another having its axis angled upwardly and inwardly with reference to the longitudinal blade axis, the axes of the two pivots and the blade axis lying substantially in the same plane.

4. In an aircraft sustaining rotor, a hub, a blade, and pivots connecting the blade with the hub, the pivots including one having its axis angled upwardly and outwardly with reference to the longitudinal blade axis and another having its axis angled upwardly and inwardly with reference to the longitudinal blade axis, the axes of the two pivots lying substantially in the same plane and intersecting each other intermediate the ends of the pivot parts.

5. In an aircraft sustaining rotor, a hub, a blade, and pivots connecting the blade with the hub, the pivots including one having its axis angled upwardly and outwardly with reference to the longitudinal blade axis and another having its axis angled upwardly and inwardly with reference to the longitudinal blade axis, whereby a leading movement of the blade about one pivot increases the incidence and about the other pivot decreases the incidence of the blade, and whereby a lagging movement of the blade causes incidence variation in the opposite senses, and means restricting movement of the blade about said two pivots beyond a predetermined range to effect a decrease in blade incidence upon either a leading or a lagging movement.

6. In an aircraft sustaining rotor, a hub, a blade, and pivots connecting the blade with the hub, the pivots including one having its axis angled upwardly and outwardly with reference to the longitudinal blade axis and another having its axis angled upwardly and inwardly with reference to the longitudinal blade axis, the axes of the two pivots further being angled with reference to a plane containing the rotor axis.

7. In an aircraft sustaining rotor, a hub, a blade, and pivots connecting the blade with the hub, the pivots including one having its axis angled upwardly and outwardly with reference to the longitudinal blade axis and another having its axis angled upwardly and inwardly with reference to the longitudinal blade axis, the axes of the two pivots lying substantially in a common plane which is angled with reference to the rotor axis.

8. In an aircraft sustaining rotor, a hub, a blade, and pivots connecting the blade with the hub, the pivots including one having its axis angled upwardly and outwardly with reference to the longitudinal blade axis and another having its axis angled upwardly and inwardly with reference to the longitudinal blade axis, the axes of the two pivots further being inclined with reference to the plane containing the rotor axis and the longitudinal blade axis in a direction upwardly and toward the trailing edge of the blade.

9. In an aircraft having a sustaining rotor, a plurality of blades incorporated in the rotor and mounted for change in pitch angle thereof from an autorotative flight pitch angle to an angle less than that for normal autorotative flight, means for driving the rotor, the mounting of the blades being such as to cause automatic change in pitch angle from a lower to a higher angle upon cessation of driving torque, and means applying a braking force to the rotor in response to a drop in driving torque below a predetermined value.

10. In an aircraft having a sustaining rotor, a plurality of blades incorporated in the rotor and mounted for change in pitch angle thereof from an autorotative flight pitch angle to an angle less than that for normal autorotative flight, means for driving the rotor, the mounting of the blades being such as to cause automatic change in pitch angle from a lower to a higher angle upon cessation of driving torque, and further being such as to cause a variation in pitch angle from a higher to a lower value upon the application of a braking torque, and means applying a braking force to the rotor in response to a drop in driving torque below a predetermined value.

11. In an aircraft having a sustaining rotor, means for applying a braking torque to the rotor, means adapted to contact with the ground or water under the influence of the alighting, and connections between said two means providing for actuation of the braking means upon contact of the second means with the ground or water.

12. An aircraft of the type having an autorotatable sustaining rotor, means providing for change in pitch of the rotor blades, and means operating by virtue of the alighting of the craft to reduce the pitch of the blades.

13. An aircraft of the type having a sustaining rotor, means providing for change in pitch of the rotor blades, means for applying a braking torque to the rotor, and means operative under the influence of the alighting of the craft to actuate the braking means and to reduce the pitch of the blades.

14. In an aircraft of the type having a sustaining rotor, rotor blades mounted for movement from a higher to a lower pitch upon application of a braking torque, means for applying a braking torque to the rotor, and means operative under the influence of the alighting of the aircraft to actuate the braking means.

15. In an aircraft having a sustaining rotor, means for applying a driving torque to the rotor including driving connections incorporating a disconnecting device, and means acting to disconnect said device under the influence of a drop in driving torque below a predetermined value.

16. In an aircraft of the type having a sustaining rotor, rotor blades mounted for movement from a higher to a lower pitch under the influence of application of a braking torque, means for applying a braking torque to the rotor operated under the influence of landing of the aircraft to actuate the braking means, means for applying a driving torque to the rotor including driving connections incorporating a disengaging device and means connected with said disengaging device for releasing the braking means when the torque applying means are connected to the rotor.

17. In an aircraft sustaining rotor, a hub, a blade and pivots connecting the blade with the hub, the pivots including a flapping pivot approximately intersecting the axis of rotation and having its axis generally transverse to a plane containing the axis of rotation and the blade axis, and a drag pivot having its axis angled upwardly and outwardly with reference to the longitudinal blade axis at a fixed angle slightly less than 90° and intersecting a plane perpendicular to the axis of rotation, the intersection of the drag pivot axis with the blade axis being spaced from the rotational axis by a relatively small offset.

18. In an aircraft having a normally autorotative sustaining rotor, a propulsive power plant, transmission means connecting the power plant and the rotor for rotor-starting purposes, a disengageable clutch in the transmission means, means operative on reduction of the starting torque applied to the rotor to increase the rotor blade pitch angles, and means operative on reduction of the rotor starting torque, with the clutch engaged, to prevent reapplication of substantial starting torque with the rotor blades set at a substantial positive pitch angle.

19. In an aircraft having a normally autorotative sustaining rotor, a propulsive power plant, transmission means connecting the power plant and the rotor for rotor-starting purposes, a disengageable clutch in the transmission means, means operative on reduction of the starting torque applied to the rotor to increase the rotor blade pitch angles, and means operative while the aircraft is off the ground and with the clutch engaged, to prevent the reapplication of substantial starting torque, the last means being operative under the influence of reduction of starting torque.

20. In an aircraft having a normally autorotative sustaining rotor, a propulsive power plant, transmission means connecting the power plant and the rotor for rotor-starting purposes, a disengageable clutch in the transmission means, means responsive to the torque applied to the rotor operating to increase the pitch of the blades upon reduction of starting torque, and means responsive to the torque applied to the rotor operating to disconnect the transmission means.

21. In an aircraft having a normally autorotative sustaining rotor, a propulsive power plant, transmission means connecting the power plant and the rotor for rotor-starting purposes, a disengageable clutch in the transmission means, means operative on reduction of the starting torque applied to the rotor to increase the rotor blade pitch angles, and means operative when the clutch is engaged and responsive to reduction in starting torque to apply a braking torque to the rotor.

22. In an aircraft having a normally autorotative sustaining rotor, a propulsive power plant, transmission means connecting the power plant and the rotor for rotor-starting purposes, a disengageable clutch in the transmission means, means operative on reduction of the starting torque applied to the rotor to increase the rotor blade pitch angles, and means operative when the clutch is engaged and responsive to reduction in starting torque to apply a braking torque to the rotor, the last means including power transmission parts which are reversible, i. e., capable of imposing the drag of the power plant on the rotor, when said clutch is engaged.

23. In an aircraft having a normally autorotative sustaining rotor, a propulsive power plant, transmission means connecting the power plant and the rotor for rotor-starting purposes, a disengageable clutch in the transmission means, means operative on reduction of the starting torque applied to the rotor to increase the rotor blade pitch angles, an overrunning coupling in the transmission means responsive to reduction in torque to disconnect the rotor from the transmission means, means for applying a braking torque to the rotor, and controls for said clutch, coupling and braking means interlocked to provide application of a braking torque to the rotor upon disconnection of said coupling when the clutch is engaged.

24. In an aircraft having a normally autorotative sustaining rotor, a propulsive power plant for the craft, transmission means connecting the power plant and the rotor for rotor-starting purposes, a disengageable clutch in the transmission means, means for applying a braking torque to the rotor, the rotor including a hub and blades, articulations connecting the blades with the hub including for each blade at least two pivots each providing freedom for pivotal blade movement generally in the plane of rotation, the movements about one and the other of said pivots being accompanied by opposite changes in pitch angle, and means for so limiting the ranges of pivotal movements that in pronounced leading and lagging displacements of the blade only one and not the same pivot is substantially operative and such pivot being operative in each case that pronounced displacement of the blade in either direction from the mean radial position is associated with a decrease of pitch angle, whereby upon application of a starting or a braking torque to the rotor the blade pitch is decreased.

25. In an aircraft having a normally autorotative sustaining rotor, a propulsive power plant for the craft, transmission means connecting the power plant and the rotor for rotor-starting purposes, a disengageable clutch in the transmission means, means for applying a braking torque to the rotor, the rotor including a hub and blades, articulations connecting the blades with the hub including for each blade at least two pivots each providing freedom for pivotal blade movement generally in the plane of rotation, the movements about one and the other of said pivots being accompanied by opposite changes in pitch angle, means for so limiting the ranges of pivotal movements that in pronounced leading and lagging displacements of the blade only one and not the same pivot is substantially operative and such pivot being operative in each case that pronounced displacement of the blade in either direction from the mean radial position is associated with a decrease of pitch angle, whereby upon application of a starting or braking torque to the rotor the blade pitch is decreased, and means operative when the clutch is engaged and responsive to reduction in starting torque to operate the braking means and thus apply a braking torque to the rotor.

26. In an aircraft having a normally autorotative sustaining rotor, a propulsive power plant, transmission means connecting the power plant and the rotor for rotor-starting purposes, a disengageable clutch in the transmission means, means operative on reduction of the starting torque applied to the rotor to increase the rotor blade pitch angles, and means for disengaging said clutch including an element adapted to contact with the ground and operative to effect disengagement when the craft takes off.

27. In an aircraft having a normally autorotative sustaining rotor, a propulsive power plant, transmission means connecting the power plant and the rotor for rotor-starting purposes, a disengageable clutch in the transmission means, means operative on reduction of the starting torque applied to the rotor to increase the rotor blade pitch angles, and means for disengaging said clutch including means normally urging the clutch toward disengaged position, a releasable catch device for retaining the clutch in engaged position, and an element adapted to contact with the ground and connected with said catch device to release the same when the craft takes off.

28. In an aircraft having a normally autorotative sustaining rotor including a hub and blades, means connecting the blades with the hub with freedom for movement to different pitch positions, an element adapted to contact with the ground, and means interconnecting said element and the rotor blades for decreasing the blade pitch angle when said element contacts with the ground.

29. In an aircraft having a normally autorotative sustaining rotor including a hub and blades, means connecting the blades with the hub with freedom for movement to different pitch positions, an element adapted to contact with the ground, and means interconnecting said element and the rotor blades for decreasing the blade pitch angle when said element contacts with the ground, the said element consisting of an alighting wheel or the like.

30. In an aircraft having a normally autorotative sustaining rotor including a hub and blades, means connecting the blades with the hub with freedom for movement to different pitch positions, an element adapted to contact with the ground, means interconnecting said element and the rotor blades for decreasing the blade pitch angle when the said element contacts with the ground, and means responsive to alighting of the craft on the ground to apply a braking torque to the rotor.

31. In an aircraft having a normally autorotative sustaining rotor including a hub and blades, means connecting the blades with the hub with freedom for movement to different pitch positions, rotor driving means including a disengageable clutch, means for applying a braking torque to the rotor, means responsive to alighting of the craft on the ground to reduce the rotor blade pitch and operate the braking means to apply a braking torque to the rotor, and means for releasing the braking means when the clutch is engaged.

32. In an aircraft, a sustaining rotor including a hub, means for applying a driving torque to the rotor, and means for applying a braking torque to the rotor, said rotor including a normally autorotationally actuated blade, and mechanism mounting the blade on the hub for movement to vary its pitch from a higher to a lower value under the influence of the application of a driving torque and from a higher to a lower value under the influence of the application of a braking torque.

33. In an aircraft, a sustaining rotor including a hub, means for applying a driving torque to the rotor, and means for applying a braking torque to the rotor, said rotor including a normally autorotationally actuated blade, mechanism mounting the blade on the hub for movement to vary its pitch from a higher to a lower value under the influence of the application of a driving torque and from a higher to a lower value under the influence of the application of a braking torque, and means operative to actuate the braking means under the influence of a predetermined drop in driving torque.

34. In an aircraft having a sustaining rotor, means for applying a driving torque to the rotor including driving connections incorporating a disconnecting device, and mechanism contacting the aircraft-supporting surface when the craft is at rest, said mechanism being operative on said device to disconnect the same under the influence of the aircraft leaving said surface and becoming air-borne.

35. In an aircraft sustaining rotor, a hub, a blade, and pivots connecting the blade with the hub, the pivots including a flapping pivot having its axis generally transverse to a plane containing the axis of rotation and the blade axis, and a drag pivot having its axis approximately perpendicular to the blade axis and generally transverse to a plane perpendicular to the axis of rotation, the intersection of the drag pivot axis with the blade axis being spaced from the rotational axis by a relatively small offset, and the blade having its mass center situated forwardly of the aerodynamic center of pressure at least at small angles of incidence of the blade.

36. In an aircraft sustaining rotor, a hub, a blade, and pivot mechanism connecting the blade with the hub, said pivot mechanism including two pivots having their axes intersecting a plane perpendicular to the rotational axis of the hub when the blade is in radial position and obliquely intersecting the longitudinal blade axis at opposing oblique angles.

37. In an aircraft sustaining rotor, a hub, a blade, and pivot mechanism connecting the blade with the hub, said pivot mechanism including two pivots having their axes intersecting a plane perpendicular to the rotational axis of the hub when the blade is in radial position and obliquely intersecting the longitudinal blade axis at opposing oblique angles, said two pivots lying in a common plane.

38. In an aircraft sustaining rotor, a hub, a blade, and pivot mechanism connecting the blade with the hub, said pivot mechanism including two pivots having their axes intersecting a plane perpendicular to the rotational axis of the hub when the blade is in radial position and obliquely intersecting the longitudinal blade axis at opposing oblique angles, said two pivots lying in a common plane which is at an angle to a plane containing the rotational axis and the longitudinal blade axis.

39. In an aircraft having a sustaining rotor comprising a hub, blades on said hub having their effective pitch variable between a position of substantial positive lift and a position of lesser pitch, means for applying driving torque to effect rotation of the rotor, means for applying braking torque to retard the rotation of the rotor, and mechanism acting to reduce the effective blade pitch in response to application either of a starting or of a braking torque, said mechanism comprising differentially angled flight pivots for said blades.

40. In an aircraft having a normally autorotative sustaining rotor and means for applying a driving torque thereto, a rotor construction comprising a hub, an aeroform blade subject to variation of effective pitch, mechanism mounting the blade on the hub for oscillating movements in the general path of rotation and adapted to effect a decrease in blade pitch angle upon oscillation of the blade in the leading direction relative to the hub, and means operative while the blade is being positively driven to maintain the pitch angle thereof at a value less than that normally utilized in flight.

41. A construction according to the preceding claim, wherein the blade is articulated to the hub by a compound articulation comprising two independent pivot axes inclined, respectively, upwardly and outwardly, and upwardly and inwardly, with respect to the blade axis, the whole assembly comprising the blade and its mounting being constructed to ensure that a displacement of the blade about said two axes cannot take place simultaneously, but only in succession, as the blade moves from the limiting leading to the limiting lagging position.

42. In an aircraft sustaining rotor, a generally upright hub, a generally radially-extending autorotatable sustaining blade, and mechanism mounting said blade on said hub including a pivot the axis of which, when viewed in plan, makes an acute angle with the longitudinal axis of the blade at the leading edge thereof, and, when viewed as projected on a plane perpendicular to said blade axis, is obliquely upwardly inclined at the trailing edge of the blade.

JUAN DE LA CIERVA.

CERTIFICATE OF CORRECTION.

Patent No. 2,155,409. April 25, 1939.

JUAN de la CIERVA.

It is hereby certified that error appears in the printed specification of the above numbered patent requiring correction as follows: Page 9, first column, line 63, claim 11, strike out the words "under the influence of the alighting" and insert instead upon landing; page 11, first column, line 63, claim 36, for "tne" read the; and that the said Letters Patent should be read with this correction therein that the same may conform to the record of the case in the Patent Office.

Signed and sealed this 30th day of May, A. D. 1939.

(Seal)

Henry Van Arsdale
Acting Commissioner of Patents.